United States Patent
Sato

(10) Patent No.: US 9,628,645 B2
(45) Date of Patent: Apr. 18, 2017

(54) IMAGE PROCESSING APPARATUS, AND CONTROL METHOD, AND COMPUTER-READABLE STORAGE MEDIUM THEREOF

(75) Inventor: Tomoya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1342 days.

(21) Appl. No.: 12/335,438

(22) Filed: Dec. 15, 2008

(65) Prior Publication Data

US 2009/0161132 A1 Jun. 25, 2009

(30) Foreign Application Priority Data

Dec. 20, 2007 (JP) ................................ 2007-328725

(51) Int. Cl.
*H04N 1/60* (2006.01)
*H04N 1/00* (2006.01)

(52) U.S. Cl.
CPC ..... *H04N 1/00413* (2013.01); *H04N 1/00222* (2013.01); *H04N 1/00416* (2013.01); *H04N 1/00464* (2013.01); *H04N 1/00474* (2013.01); *H04N 1/00503* (2013.01); *H04N 1/00511* (2013.01); *H04N 1/00514* (2013.01)

(58) Field of Classification Search
CPC ........... H04N 1/00222; H04N 1/00413; H04N 1/00416; H04N 1/00514
USPC ................................................. 709/217–219
See application file for complete search history.

(56) References Cited

U.S. PATENT DOCUMENTS

| | | | | |
|---|---|---|---|---|
| 7,290,042 | B2 * | 10/2007 | Kinoshita et al. | 709/219 |
| 7,327,478 | B2 * | 2/2008 | Matsuda | 358/1.14 |
| 2001/0042086 | A1 * | 11/2001 | Ueda et al. | 707/527 |
| 2003/0088793 | A1 | 5/2003 | Parry | |
| 2003/0095691 | A1 | 5/2003 | Nobuhara et al. | |
| 2003/0233437 | A1 * | 12/2003 | Kitada et al. | 709/223 |
| 2005/0012956 | A1 | 1/2005 | Castle | |
| 2005/0108353 | A1 | 5/2005 | Yamamoto | |
| 2005/0213147 | A1 * | 9/2005 | Minatogawa | 358/1.15 |
| 2006/0059462 | A1 * | 3/2006 | Yamamoto | 717/115 |

(Continued)

FOREIGN PATENT DOCUMENTS

| | | |
|---|---|---|
| CN | 1421817 A | 6/2003 |
| EP | 1499101 A1 | 1/2005 |

(Continued)

*Primary Examiner* — Abdullahi E Salad
(74) *Attorney, Agent, or Firm* — Canon U.S.A., Inc. IP Division

(57) ABSTRACT

An image processing apparatus, which has an input unit configured to input image data and which is communicably connected to an external apparatus via a network, includes an obtaining unit configured to obtain a document with a predetermined form that includes a request for input of image data, via the network from the external apparatus; a display unit configured to display, in the event of displaying a screen corresponding to the document obtained by the obtaining unit, a screen including a display object based on the predetermined form, the display object to instruct inputting of image data by the input unit; a determining unit configured to determine whether or not to display the display object on the display unit; and a control unit configured to control the display of the display object by the display unit, according to determination results of the determining unit.

11 Claims, 22 Drawing Sheets

(56) References Cited

U.S. PATENT DOCUMENTS

2006/0061805 A1\* 3/2006 Kawamura ................. 358/1.15
2006/0271936 A1\* 11/2006 Matsuda et al. ............. 718/102
2007/0109577 A1   5/2007 Yoshida
2007/0268315 A1\* 11/2007 Hoshino ...................... 345/642

FOREIGN PATENT DOCUMENTS

| JP | 2001-345983 A | 12/2001 |
| JP | 2005-114790 A | 4/2005 |
| JP | 2005-149320 A | 6/2005 |
| JP | 2006-270712 A | 10/2006 |

\* cited by examiner

```
1   <html>
2       <head>
3           <title>APPLICATION</title>
4       </head>
5       <body>
6           <h1>PLEASE SEND APPLICATION</h1>
7           <form enctype="multipart/form-data" method="post" action="regist.cgi">
8               <input type="file" name="userFile">
9               <input type="submit" value="SEND">
10          </form>
11      </body>
12  </html>
```

FIG. 19

PLEASE SEND APPLICATION

SELECT FROM BOX

SEND

FIG. 21

PLEASE INPUT USER ID AND PASSWORD

USER ID

PASSWORD

FIG. 22

PLEASE SEND APPLICATION

IMAGE CANNOT BE UPLOADED

OK

IMAGE PROCESSING APPARATUS, AND CONTROL METHOD, AND COMPUTER-READABLE STORAGE MEDIUM THEREOF

BACKGROUND OF THE INVENTION

Field of the Invention

The present invention relates to an image processing apparatus which is communicably connected to an external apparatus via a network, and a control method, and computer-readable storage medium thereof.

Description of the Related Art

With HTML (HyperText Markup Language), a web page creator can request input of information as to a user viewing the web page with a form that includes predetermined form elements. An HTML form is an effective tool for various types of applications which require input from users, and makes up a user interface between the web page creator and the user. Thus, a web application is provided which operates on the web server side and can be operated from the web browser of a client.

The web browser of the user which is the client requests HTML resources as to a web browser, and upon obtaining from the server, a user interface based on HTML is displayed on the web browser of the client. When the user inputs information in the form displayed on the web browser and confirms this, the input information is transmitted from the client to the server. Information replied as to the input information, i.e. content wherein execution results of the web application are reflected, can then be obtained from the server. In many cases, the replied content is a user interface of the web application made up with the HTML form. With repeating thus, a so-called distributed application system which is a web application operated on a server at a distant location that is operated by a user interface transmitted on the web browser of the client, is realized.

A great number of systems have realized HTML, which has bidirectionality of information transmissions, to be employed as a user interface description language which can be transferred distantly over a user interface by using forms.

A method for "file upload based on HTML form" is disclosed in RFC 1867. This method expands the bidirectionality of the information transmission by the HTML forms and enables uploading a file stored in a client platform as input as to the server of the distributed application. According to this method, a general web browser currently employed and a large amount of web content are installed.

A screen example of a form displayed on a general web browser by the technique shown in RFC 1867 is shown in FIG. 26. A screen 2601 in this form is generated based on an HTML document in later-described FIG. 10, and is displayed on a content display region 905 in a later-described web browser. In this screen, a display 2602 corresponds to an h1 element in the 6th row in FIG. 10, and the region surrounded with a line in a display 2603 corresponds to an "input" element in "file" form in the 8th row in FIG. 10. Also, a display 2604 corresponds to the "input" element of a "submit" form of the 9th row in FIG. 10.

Within the display 2603 region is an implementation by a method generally employed with a conventional web browser, and this implementation is also shown in the RFC 1867. Within the display 2603 region, the display 2605 is a file name input field, wherein a file path (file name) in a file system of the file to be uploaded to the server can be input by typing. Also, a display 2606 corresponds to a file selection button, and when this button is pressed, the web browser can enter a file selection mode applicable to the operating platform. With a web browser operated on a general-use computer, a file selection dialog box is opened, whereby the file to be uploaded from the group of files stored in the file system can be selected.

On the other hand, in accordance with the development and wide-spread use of Internet technology, a wide variety of distribution application services are being provided which presume the generally-used web browser to be the client. In particular, in the field of information technology, application service providers (ASP) which are vendors specializing in providing web-based distributed applications have begun providing services. Services provided by an ASP include information service, creating, searching, storing, authentication, distribution, printing, publishing, managing, translating, commissioning, and so forth. Also, governmental paperwork and various types of electronic business transactions may be offered.

Within the field of built-in systems also, a remote user interface is made into a product which a web server function is provided in addition to the original apparatus functions on an apparatus to provide a user interface of the apparatus to a distant web browser. Also, a technology is currently provided to the apparatus functions wherein a web client function is provided in addition to the original apparatus functions on an apparatus to obtain (download) various content from a distant web server and perform browsing. As an example of such an apparatus is an image processing apparatus with a built-in web browser, for example.

If performing uploading of image data not digitized can be performed in the workflow of the distributed application provided by the ASP, the likelihood of a distributed application increases. For example, in a workflow for electronic business transactions or governmental paperwork, it is anticipated that input such as order forms with a seal or signature or public documents such as various types of identification certificates can be obtained at an appropriate timing during the paperwork process.

In the case that a system is made up by joining the web client corresponding to a general-use web application and an image input unit, the image data input with the image processing apparatus has to be stored in a storage unit such as an HD. Subsequently, the file thereof is uploaded, resulting in two operations being performed. That is to say, there is a problem wherein the two steps of an image input step and an upload step are required, and accordingly, the operation thereof becomes cumbersome.

To solve this problem, there is a technique to use a web browser built in to the image processing apparatus to readily perform uploading of image data not digitized (Japanese Patent Laid-Open No. 2005-149320). As a screen based on description of an "input" element in "file" form, displaying a button to read an image on an original, input the image data, and directly upload the input image data, is described in Japanese Patent Laid-Open No. 2005-149320.

Recently, inputting image data using various methods have been enabled with image processing apparatuses. For example, as disclosed in the above-described Japanese Patent Laid-Open No. 2005-149320, there is a method to read an image on an original and input the image data, and a method to read out and input the image data stored beforehand on a storage device provided within the image processing apparatus. Additionally, recently a method to obtain and input image data stored in a portable terminal such as a digital camera directly connected to an image processing apparatus is also employed.

A user desiring to upload image data to an external apparatus such as a server using the above-described file upload function first accesses the server, then obtains a document with a form that includes a form element for file uploading from the server. When using this form to upload image data, a desired input method is selected from various input methods, and the image data is input with the selected input method and uploaded.

However, as described above, recently the image processing apparatus can use various input methods to input image data, whereby the operations can be extremely complicated to a user not accustomed to handling the image processing apparatus. In particular, to a user not accustomed to handling the web application, with an image processing apparatus wherein the image data to be uploaded can be input with multiple input methods, the instructions for file uploading can be time-consuming.

SUMMARY OF THE INVENTION

The present invention provides for an image processing apparatus that displays an appropriate display object, and the control method, and computer-readable storage medium thereof, in the event of displaying a screen corresponding to a document with a predetermined form.

Some embodiments of the present invention provide an image processing apparatus, which has an input unit configured to input image data and which is communicably connected to an external apparatus via a network, comprising an obtaining unit configured to obtain a document with a predetermined form that includes a request for input of image data, via the network from the external apparatus; a display unit configured to display, in the event of displaying a screen corresponding to the document obtained by the obtaining unit, a screen including a display object based on the predetermined form, the display object to instruct inputting of image data by the input unit; a determining unit configured to determine whether or not to display the display object on the display unit; and a control unit configured to control the display of the display object by the display unit, according to determination results of the determining unit.

Some embodiments of the present invention provide an image processing apparatus which is communicably connected to an external apparatus via a network, comprising a reading unit configured to read an image on an original and output image data; a storage unit configured to store the image data; an obtaining unit configured to obtain a document with a predetermined form that includes a request for input of image data via the network from the external device; and a display unit configured to display, in the event of displaying a screen corresponding to the document obtained by the obtaining unit, a display object based on the predetermined form, wherein a first display object to instruct inputting image data output by the reading unit and a second display object to instruct read out and input image data stored in the storage unit are displayed on the same screen.

Some embodiments of the present invention provide a control method of an image processing apparatus, which has an input unit configured to input image data and which is communicably connected to an external apparatus via a network, comprising obtaining a document with a predetermined form that includes a request for input of image data, via the network from the external apparatus; displaying, in the event of displaying a screen corresponding to the document obtained with the obtaining, a screen including a display object based on the predetermined form, the display object to instruct inputting of image data by the input unit; determining whether or not to display the display object with the displaying; and controlling the display of the display object according to determination results of the determining.

Some embodiments of the present invention provide a control method of an image processing apparatus which is communicably connected to an external apparatus via a network, comprising reading an image on an original and outputting image data; storing the image data in a storage unit; obtaining a document with a predetermined form that includes a request for input of image data via the network from the external device; and displaying, in the event of displaying a screen corresponding to the document obtained with the obtaining, a display object based on the predetermined form, wherein a first display object to instruct inputting image data output in the reading and a second display object to instruct read out and input image data stored in the storage unit are displayed on the same screen.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 19 is a diagram illustrating a screen example displayed on a web browser according to an embodiment of the present invention.

FIG. 21 is a diagram illustrating a screen example displayed on an LCD display unit according to an embodiment of the present invention.

FIG. 22 is a diagram illustrating a screen example displayed on a web browser according to an embodiment of the present invention.

DESCRIPTION OF THE EMBODIMENTS

Embodiments of the present invention will be described below.

Figure 1:
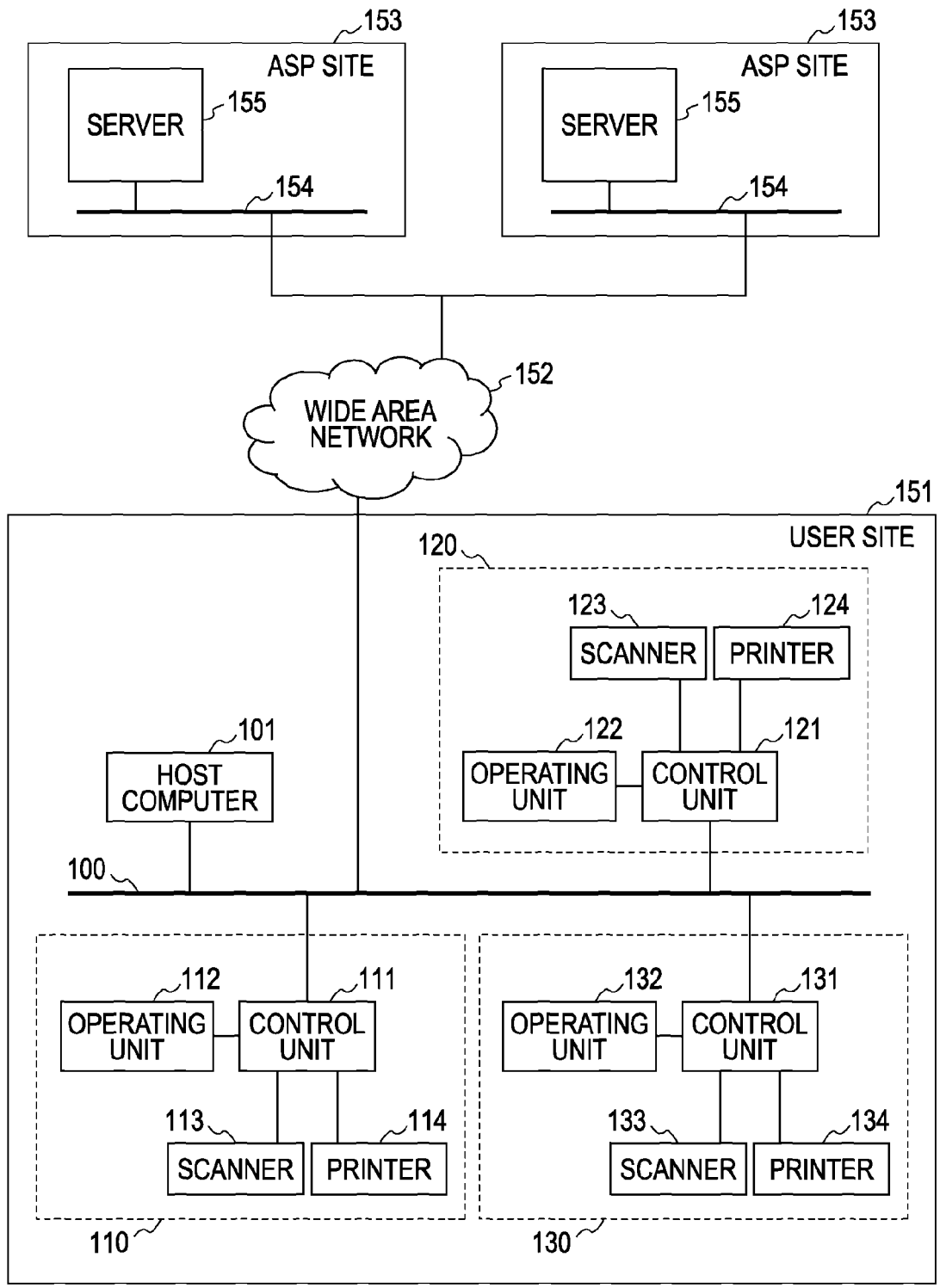
FIG. 1 is an overall system diagram according to an embodiment of the present invention.

FIG. 1 is a block diagram showing an overall configuration of a system including an image processing apparatus relating to a first embodiment of the present invention. As shown in FIG. 1, a system is made up of an application server provider site (hereafter called ASP site) 153, wide area network 152, and user site 151. A wide area network 152 here refers to the Internet. Also, the wide area network 152 may be a virtual private network (VPN) on the Internet or a dedicated private network.

The ASP site 153 provides a predetermined service to the user site 151 via the wide area network 152. Services provided by the ASP site 153 may include information service, creating, searching, storing, authentication, distribution, printing, publishing, managing, translating, commissioning, and so forth. Also, governmental paperwork and various types of electronic business transactions may be offered. The ASP site 153 includes a LAN (Local Area Network) 154 and server 155. The LAN 154 is a network within the ASP site 153, and connects network devices within the site. Also, the LAN 154 is connected to the wide area network 152 via a router or the like.

A software process group for realizing the service provided by the ASP operates on the server 155. A software module may be 1) an HTTP server that transmits content such as HTML in response to a request by the HTTP protocol from the client, 2) a web application group which is executed with the HTTP server according to HTTP requests, performs predetermined processing and HTTP responses, and is installed with a CGI (Common Gateway Interfaces) program or servlet, and 3) a business logic group such as electronic business transaction program and backend database management system, used for a CGI program or servlet to execute predetermined processing.

The user site 151 is made up of a host computer 101, multiple network devices such as image processing apparatuses 110, 120, 130, and a LAN 100 to which the network device group is connected. The LAN 100 of the user site 151 is connected to the wide area network 152 via a router or the like. The router has a so-called firewall function. That is to say, the router performs packet filtering to protect the user site 151 from attacks by an external network. Also, with the router, there may be cases wherein network address conversions or network port conversions are performed for address management reasons and so forth.

Restrictions are placed on communication between the user site 151 and external network for such router functions. That is to say, in many cases, communication is enabled only for several defined protocols. For example, the HTTP connections established from inside toward the outside is generally permissible communication, and this is one reason that application service providing based on general web-based technology is valid.

The image processing apparatus 110 is an MFP (Multi Function Peripheral) that performs input/output and sending/receiving of an image and various types of image processing. The image processing apparatus 110 has a scanner 113 which is an image input device, printer 114 which is an image output device, control unit 111, and operating unit 112 which is a user interface. The scanner 113, printer 114, and operating unit 112 are each connected to the control unit 111, and are controlled by commands from the control unit 111. The control unit 111 is connected to the LAN 100.

Each of the image processing apparatuses 120 and 130 have similar device configurations as the image processing apparatus 110, and are similarly connected to the LAN 100, and communicably connected to the image processing apparatus 110 and ASP site 153. The image processing apparatus 120 has a scanner 123, printer 124, operating unit 122, and a control unit 121 which controls each of the scanner 123, printer 124, and operating unit 122. Also, the image processing apparatus 130 has a scanner 133, printer 134, operating unit 132, and a control unit 131 which controls each of the scanner 133, printer 134, and operating unit 132.

The host computer 101 is connected to the LAN 100. The host computer 101 has a web browser as described later, and displays status of the image processing apparatuses 110, 120, and 130, based on an HTML file received from the image processing apparatuses 110, 120, and 130. Also, the host computer 101 can perform HTTP connection to the server 155 and receive service providing.

Figure 2:
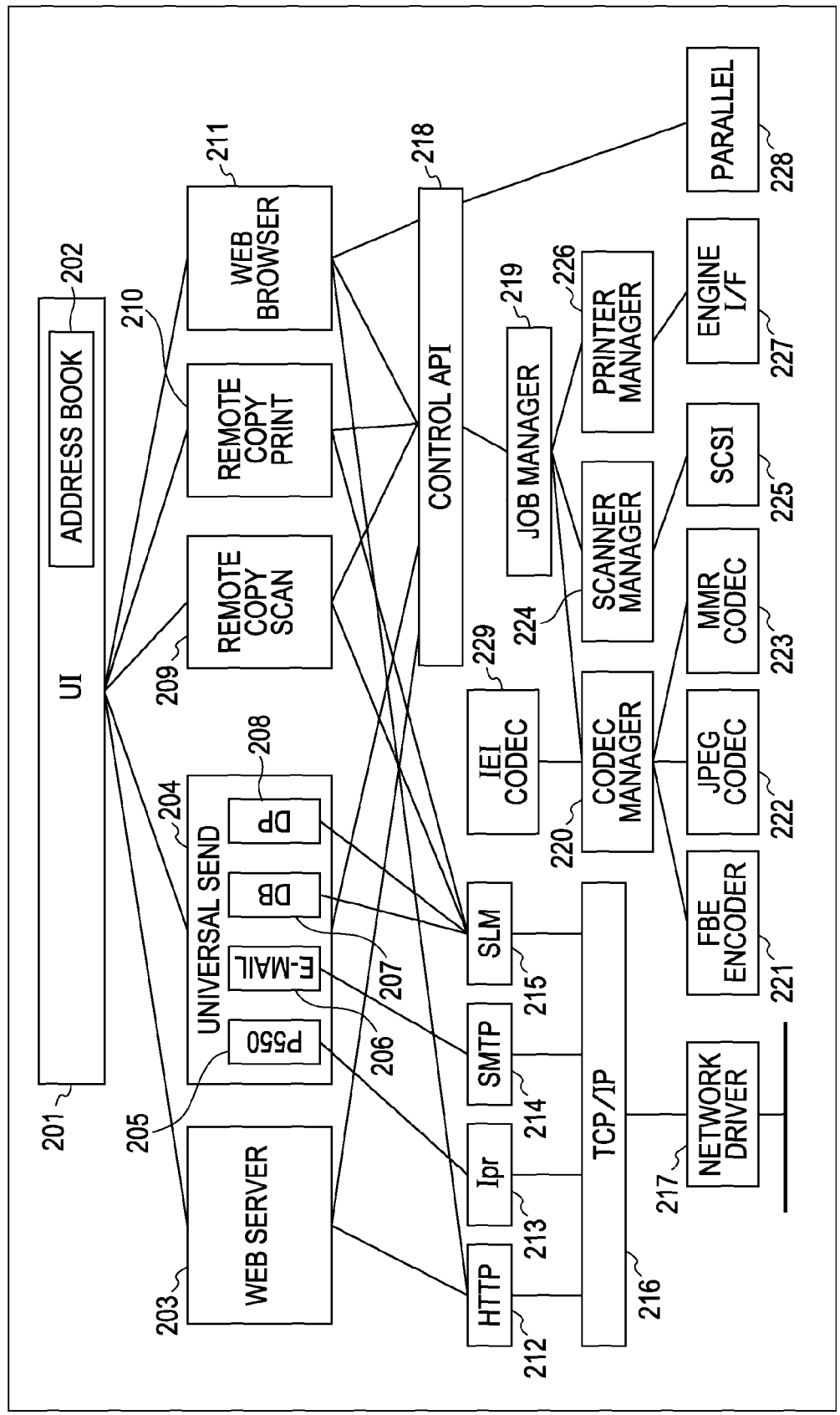
FIG. 2 is a software configuration diagram according to an embodiment of the present invention.

Next, the software configuration of the image processing apparatus 110 will be described with reference to FIG. 2. FIG. 2 is a block diagram illustrating the software configuration of the image processing apparatus 110 in FIG. 1. The software configuration of the various image processing apparatuses 110, 120, and 130 are the same, so will be described as the software configuration of the image processing apparatus 110.

A user interface (hereafter, UI) module 201 is implemented in the image processing apparatus 110. The UI module 201 is a module to perform mediation between a device and user operation in the event that an operator performs various types of operations/settings as to the image processing apparatus 110. In accordance with operator operations, the UI module 201 transfers input information to later-described various types of modules and requests processing, and performs data settings and so forth.

Also, an address book (Address-Book) module 202 installed in the image processing apparatus 110, and the module 202 is a database module that manages data transmission destinations, communication destinations, and so forth. Regarding the data that the address book module 202 manages, adding, deleting, and obtaining data can be performed with operations from the UI module 201. Also, the address book module 202 data transmission/communication destination information to each module will be described later with operations by an operator.

Also, a web server module (Web-Server module) 203 notifies management information of the image processing apparatus to a web client (e.g. host computer 101) based on a request from the web client. The above-described managing information is obtained via a later-described universal sending unit module 204, remote copy scan module 209, remote copy print module 210, and control API module 218. The managing information is communicated to the web client via a later-described HTTP module 212, TCP/IP communication module 216, and network driver 217.

Also, a web browser (Web Browser) module 211 is installed in the image processing apparatus 110, and the module reads and displays information of various websites on the Internet or intranets. Details of the configuration of the web browser module 211 will be described later.

The universal sending unit (Universal-Send) module 204 is a module that governs data distribution, and the module 204 distributes data instructed by the operator via the UI module 201 to a similarly instructed communication (output) destination. Also, in the case that the scanner function of the present device is used by the operator to instruct generation of distribution data, the universal sending unit (Universal-Send) module 204 causes the device to operate via a control API module 218, and performs data generating. The universal sending unit module 204 has a module (P550) 205 to execute in the event that a printer is specified as the output destination and a module (E-mail) 206 to execute in the event that an E-mail address is specified as the communication destination. Further, the universal sending unit module 204 has a (DB) module 207 to execute in the event that a database is specified as the output destination and a (DP) module 208 to execute in the event that an image processing apparatus similar to the present device is specified as the output destination.

A remote copy scan (Remote-Copy-Scan) module 209 uses the scanner function of the image processing apparatus 110 to read image information, and outputs the read image information to another image processing apparatus connected with a network or the like. Thus, the copy function realized with a single image processing apparatus is performed using another image processing apparatus.

The remote copy print (Remote-Copy-Print) module 210 uses the printer function of the main image processing apparatus 110 to output the image information obtained with the other image processing apparatus connected with a network or the like. Thus, the copy function realized with a single image processing apparatus is performed using another image processing apparatus.

An HTTP module 212 is used in the event of the image processing apparatus 110 performing communication by HTTP, and uses a later-described TCP/IP communication module 216 to provide a communication function to the web server module 203 or web browser module 211. Also, the module 212 provides a communication function corresponding to various types of protocol, particularly according to a protocol corresponding to security, used on the web beginning with HTTP.

Also, an 1pr module 213 is implemented in the image processing apparatus 110, and this module uses the later-described TCP/IP communication module 216 to provide a communication function to the module 205 within the universal sending unit module 204.

Also, an SMTP module 214 is implemented in the image processing apparatus 110, and this module uses the later-described TCP/IP communication module 216 to provide a communication function to the E-mail module 206 within the universal send uniting module 204.

Also, a SLM (Salutation-Manager) module 215 uses the later-described TCP/IP communication module 216 to provide a communication function to the module 217 and module 218 within the universal sending unit module 204. The SLM (Salutation-Manager) module 215 provides a communication function to each of the remote copy scan module 209 and remote copy print module 210 also.

A TCP/IP communication module 216 uses a network driver 217 to provide a network communication function to the above-described various modules. The network driver 217 controls a portion that is physically connected to the network.

A control API 218 provides an interface as to downstream modules such as a later-described job manager module (Job-Manager) 219 to upstream modules such as the universal sending unit 204. Thus, the dependence relation between the upstream and downstream modules is reduced, thereby improving the compatibility of each.

The job manager module (Job-Manager) 219 interprets various processing instructed by the above-described various modules via the control API 218, and provides instructions to the later-described modules 220, 224, and 226. Also, the job manager module 219 consolidates the hardware processing executed within the image processing apparatus 110.

The module 220 is a codec manager (CODEC-Manager) module, and this module manages/controls various compressions/decompressions of data within the processing that the job manager module 219 instructs.

Also, an FBE encoder module (FBE-Encoder) 221 compresses the data read in by the scanning processing executed by the job manager module 219 or a later-described scan manager module 224.

Also, a JPEG codec module (JPEG-CODEC) 222 performs JPEG compression processing of the data read in with the scanning processing executed by the job manager module 219 or scan manager module 224. Also, the JPEG codec module (JPEG-CODEC) 222 performs JPEG decompression processing of the printing data used for printing processing executed by a print manager (Print-Manager) module 226.

Also, an MMR codec (MMR-CODEC) module 223 performs MMR compression processing of data read in with the scanning processing executed by the job manager module 219 or scan manager module 224. Also, the MMR codec (MMR-CODEC) module 223 performs MMR decompression processing of the printing data used with the printing processing executed with the print manager module 226.

Also, an information-embedded-image codec (IEI CODEC) module 229 decodes information embedding in the image data read in with the scanning processing executed by the job manager module 219 or scan manager module 224. Also, the information-embedded-image codec (IEI CODEC) module 229 performs information embedding processing to the print data used with the printing processing executed with the print manager module 226. Embedding information into image data is performed using encoding techniques such as barcodes and digital watermarking and so forth. Also, the module 209 supports character recognition, wherein a character within an image of the image data is recognized and converted into text data by image-region separation and OCR technique, as a type of decoding technique. Further, overlaying the converted image data wherein text is converted into image data using a raster image processor and the original image data is supported as a type of encoding technique (information embedding technique).

The scan manager (Scan-Manager) module 224 manages and controls the scanning processing that the job manager module 219 instructs. The communication between the scanner 113 connected internally to the scan manger module 224 and image processing apparatus 110 is performed via an SCSI driver 225.

The print manager (Print-Manager) module 226 manages and controls the printing processing that the job manager module 219 instructs. The interface between the print manager module 226 and the printer 114 is provided by an engine interface (Engine-I/F) module 227.

Also, a parallel port driver 228 is implemented in the image processing apparatus 110, and this driver provides an interface in the event of the web browser module 211 outputting data to an unshown output device via a parallel port.

Figure 3:
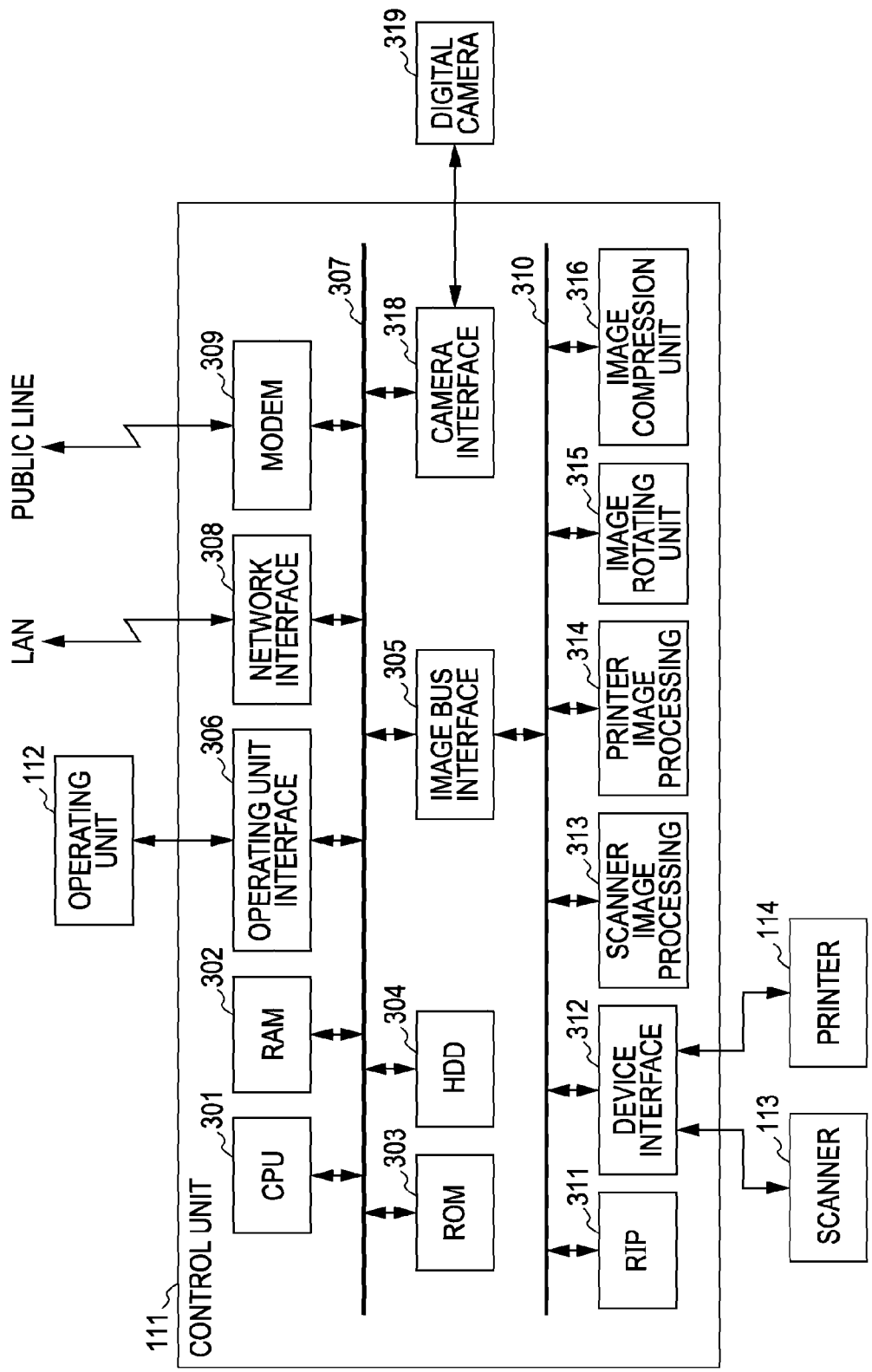
FIG. 3 is a block diagram illustrating a configuration of an image processing apparatus according to an embodiment of the present invention.

Next, the configuration of the image processing apparatus 110 will be described with reference to FIG. 3. FIG. 3 is a block diagram showing a detailed configuration of the image processing apparatus 110 in FIG. 1. The configuration of each of the image processing apparatuses 110, 120, and 130 are the same, so only the configuration of the image processing apparatus 110 will be described.

The image processing apparatus 110 has a control unit 111 to control the overall apparatus, such as shown in FIG. 3. The control unit 111 is connected to a scanner 113 which is an image input device and a printer 114 which is an image output device, and controls these, while also being connected to a LAN or public line and via these performs input/output of image information and device information.

The control unit 111 has a CPU 301, RAM 302, ROM 303, HDD (hard disk device) 304, image bus interface 305, operating unit interface 306, network interface 308, and modem 309. The CPU 301 is connected to each of the above-described units via a system bus 307.

The RAM 302 is memory for providing a work area for the CPU 301, and also is used as image memory to temporarily store image data. The ROM 303 is a boot ROM, and a system boot program is stored in the ROM 303. System software, image data, and so forth are stored in the HDD 304.

The operating unit interface 306 is an interface for performing input/output between the operating unit 112, and performs such functions as outputting image data displayed on the operating unit 112 as to the operating unit 112, and transmitting the information input by the user via the operating unit 112 to the CPU 301.

The network interface 308 is connected to a LAN, and performs input/output of information as to the LAN. The modem 309 is connected to a public line, and performs input/output of information as to the public line.

The image bus interface 305 connects the system bus 307 and the image bus 310 which transfers image data at high speed, and is a bus bridge that converts the data configuration. The image bus 310 is connected to a RIP (raster image processor) 311, device interface 312, scanner image processing unit 313, printer image processing unit 314, image rotating unit 315, and image compressing unit 316.

The RIP 311 rasterizes a PDL code received from the LAN in a bitmap image. The device interface 312 connects the scanner 113 and printer 114 and control unit 111, and performs synchronous/asynchronous conversion of the image data. The scanner image processing unit 313 performs correcting, processing, editing and so forth as to the input image data. The printer image processing unit 314 performs printer correction, resolution conversion and so forth as to the print output image data. The image rotating unit 315 performs rotating of image data. The image compressing unit 316 performs JPEG compression/decompression processing as to multi-value image data, and performs compression/decompression processing such as JBIG, MMR, MH, and so forth as to binary image data.

A camera interface 318 connects the digital camera 319 and control unit 111. The digital camera 319 is a portable terminal which is connectable to the image processing apparatus 110, and can input the image data stored in the digital camera 319 to the image processing apparatus 110 via the digital camera interface 318.

Figure 4:
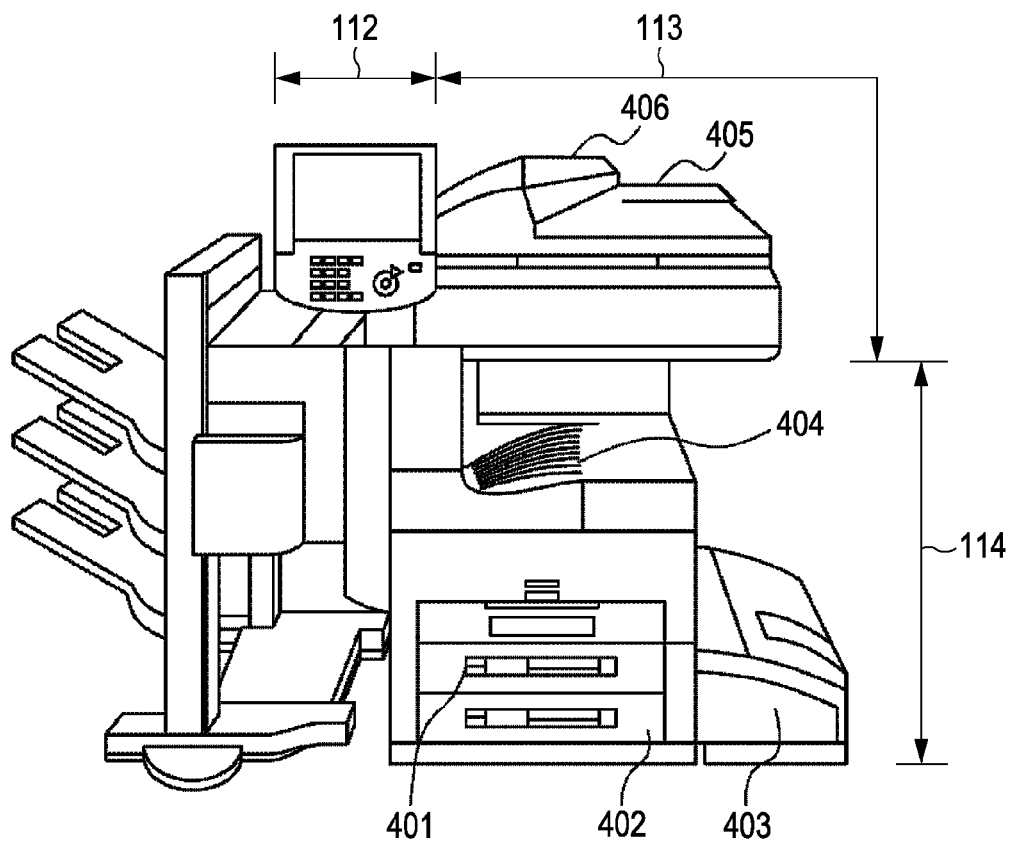
FIG. 4 is an external view of the image processing apparatus according to an embodiment of the present invention.

An external view of the image processing apparatus having the above-described configuration will be described with reference to FIG. 4. FIG. 4 is an external view of the image processing apparatus 110 in FIG. 1. The external view of each of the image processing apparatuses 110, 120, and 130 are the same, so only the external view of the image processing apparatus 110 will be described.

With the image processing apparatus 110, the scanner 113 illuminates the image on a sheet serving as an original, and scans this with a CCD line sensor (unshown), whereby raster image data is generated. Upon a user setting the original sheet on a tray 406 of a document feeder 405 and instructing the start of reading with the operating unit 112, the CPU 301 of the controller unit 111 provides instructions to the scanner 113. The document feeder 405 feeds one original sheet at a time, and the scanner 113 performs a reading operation of the image on the original sheet fed from the document feeder 405.

The printer 114 prints the raster image data on a sheet, and as a printing method thereof, an electrophotography method is used which uses a photosensitive drum and photo conductor belt. However, it goes without saying that another method may be used, such as an inkjet method which discharges ink from a minute nozzle array and directly prints the image onto a sheet. The printing operation of the printer 114 is started by instructions from the CPU 301. The printer 114 has multiple supply sheet levels so that different sheet sizes or difference sheet orientations can be selected, whereby sheet cassettes 401, 402, and 403 corresponding thereto are mounted. Also, a discharge tray 404 is provided on the printer 114, and the sheets finished printing are discharged onto the discharge tray 404.

Figure 5:
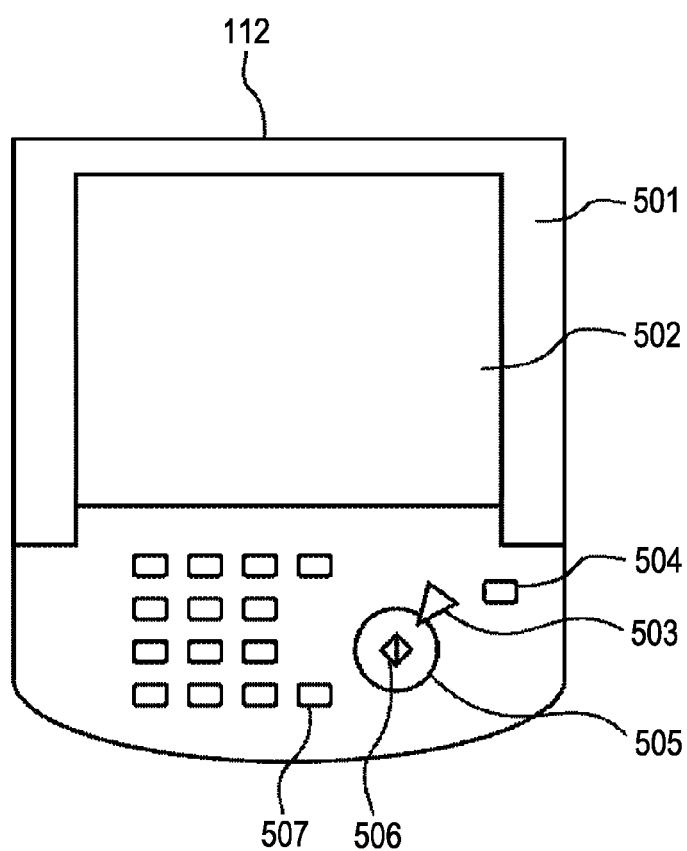
FIG. 5 is an external view of an operating unit according to an embodiment of the present invention.

Next, the configuration of the operating unit 112 will be described with reference to FIG. 5. FIG. 5 is a diagram showing an external configuration of the operating unit 112 in FIG. 1.

The operating unit 112 has an LCD display unit 501 with a touch panel sheet 502 pasted on the LCD, as shown in FIG.

5. A system operating screen and touch-panel keys are displayed on the LCD display unit 501, and when the displayed key is pressed, the position information indicating the pressed position is transmitted to the CPU 301.

Also, various hard keys which are a start key 505, stop key 503, ID key 507, and reset key 504 are provided on the operating unit 112. The start key 505 is a key to instruct starting the reading operation of the original image, and in the center of the start key 505 is a green and red two-color LED display portion 506. The two-color LED display portion 506 shows whether or not the start key 505 is in a usable state by the color thereof. The stop key 503 is a key to stop the operations during operation. The ID key 507 is a key used when inputting the user ID of the user. The reset key 504 is a key used when initializing settings from the operating unit 112.

Figure 6:
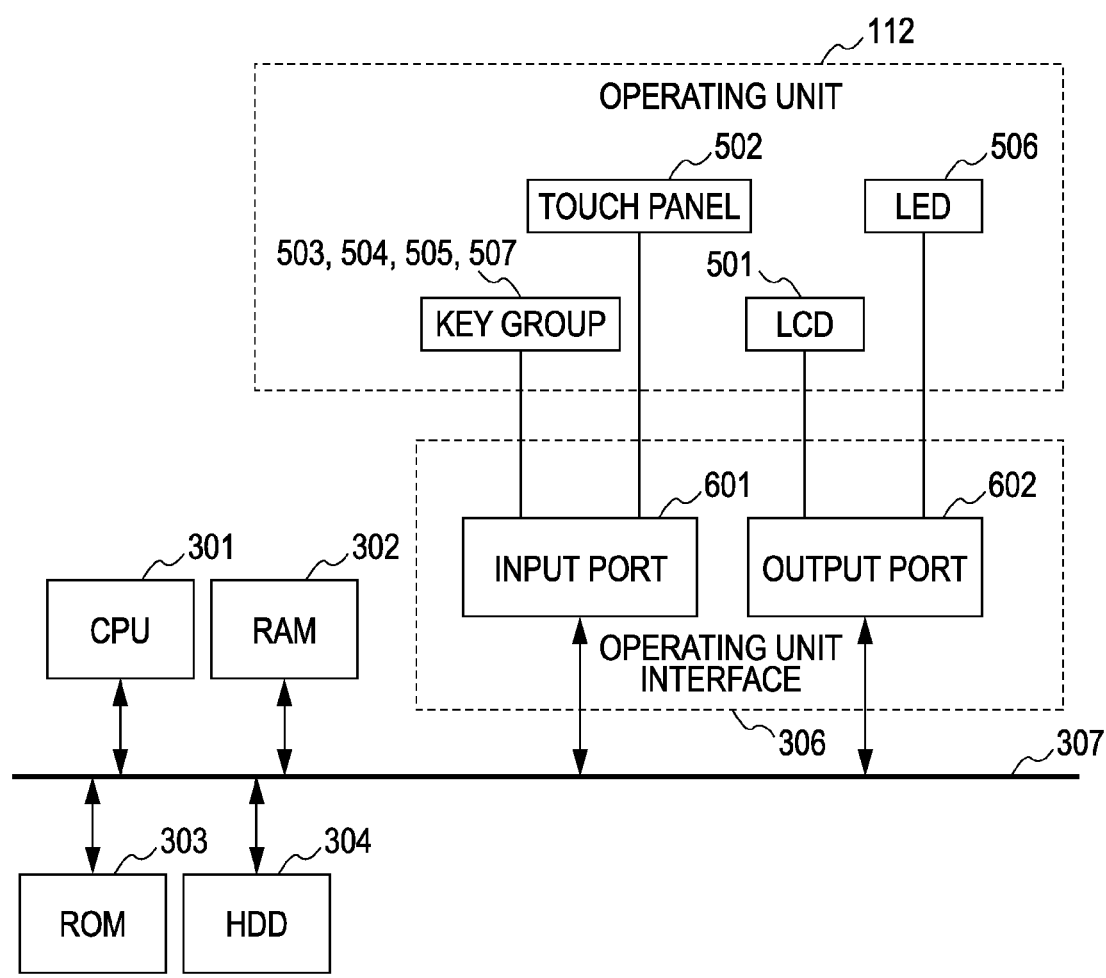
FIG. 6 is a block diagram illustrating a configuration of the operating unit according to an embodiment of the present invention.

Next, the configuration of the operating unit 112 will be described with reference to FIG. 6. FIG. 6 is a block diagram showing a detailed configuration of the operating unit 112 in FIG. 1. The operating unit 112 is connected to the system bus 307 via the operating unit 306, such as shown in FIG. 6. As described above, the system but 307 is connected to the CPU 301, RAM 302, ROM 303, HDD 304, and so forth.

The operating unit interface 306 has an input port 601 for controlling input from the user and an output port 602 for controlling the screen output device. The input port 601 transfers the user input from the touch panel 502 and a key group including various hard keys 503, 504, 505, and 507 to the CPU 301. The CPU 301 generates display screen data based on user input content and a control program, and outputs a display screen on the LCD display unit 501 via the output port 602. Also, the CPU 301 controls the LED display unit 506 as needed via the output port 602.

Next, a box function that the image processing apparatus 110 has will be described. A temporary region and a box region are provided on the HDD 304 as regions to store the image data. The temporary region is a region to temporarily store image data which the scanner 113 has read and output an image on an original. Note that the image data stored in the temporary region is deleted after the job is finished.

The box region is a region for storing image data that the scanner 113 has read and output an image on an original and image data that PDL data received from the host computer 101 is rasterized. Note that the box region is divided into multiple regions which individual users can individually use, and a number is assigned to each region. A region 100 is provided in the box region of the HDD 3004 of the image processing apparatus 110.

Note that with the description below, the image data stored in the box region may be called "document", but the data format stored in the box region may be any format that can be rasterized into image data. For example vector data or text code data may be used. In the first embodiment, the data herein is called image data or document, and "image data" and "document" are not particularly distinguished.

Figure 7:
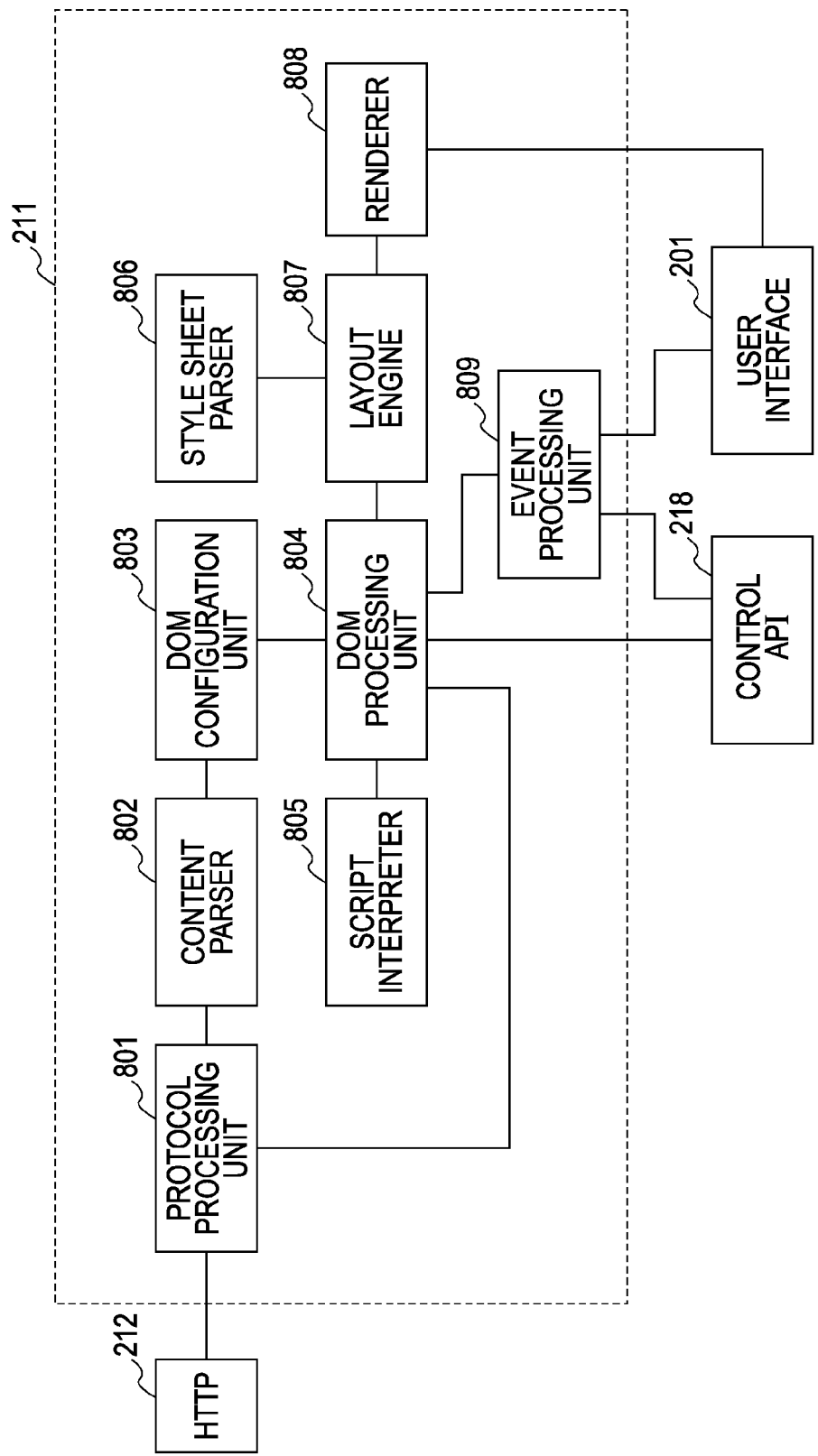
FIG. 7 is a block diagram illustrating a software configuration of a web browser module according to an embodiment of the present invention.

Next, the software configuration of the web browser module 211 will be described with reference to FIG. 7. FIG. 7 is a block diagram showing a software configuration of the web browser module 211. The web browser module 211 includes a protocol processing unit 801, content parser 802, DOM configuration unit 803, and DOM processing unit 804. Further, the web browser module 211 includes a layout engine 807, style sheet parser 806, renderer 808, scrip interpreter 805 and event processing unit 809.

The protocol processing unit 801 establishes a connection between another network node via the HTTP module 212 and communicates. With this communication, an HTTP request is issued as to a resource described with the URL, and the response thereof is obtained. In this process, encoding/decoding of the communication data in accordance with various encoding formats are also performed.

The content parser 802 receives content data expressed with an expression format such as HTML, XML, XHTML and so forth from the protocol processing unit 801, performs lexical analysis and syntax analysis and generates a parse tree.

The DOM configuration unit 803 receives the parse tree from the content parser 802, and performs configuring of a Document Object Model (DOM) corresponding to the configuration of the content data. With currently-used HTML, various grammatical omissions are forgiven, resulting in multiple variations. Further in many cases the content currently used in the real world is neither in integral form nor appropriate. Thus, the DOM configuration unit 803 infers the correct logical configuration of the content data that is not lexically appropriate, similar to other general web browsers, and attempts configuration of an appropriate DOM.

The DOM processing unit 804 holds the DOM which the DOM configuration unit 803 has configured on the memory as a tree configuration expressing a nested relation of an object group. The various processing of the web browser is realized with the DOM as the center thereof.

The layout engine 807 recursively determines an expression (presentation) on the display of each object according to the tree configuration of the object group that the DOM processing unit 804 holds, and consequently obtains the layout of the overall document. There may be cases wherein expressions on the display for each object are clearly specified with a style sheet format such as a Cascading Style Sheet (CSS), according to the description embedded in the document or a description within a separate file linked from the document. Also, the layout engine 807 reflects the analysis results of the style sheet by the style sheet parser 806 and determines the layout of the document. The style sheet parser 806 analyzes the style sheet associated to the content document.

The renderer 808 generates Graphical User Interface (GUI) data for displaying on the LCD 501 according to the document layout that the layout engine 807 has determined. The generated GUI data is displayed on the LCD 501 with the UI interface 201.

The event processing unit 809 receives operation events that the user has performed as to the touch panel sheet 502 and various keys on the operating unit 112, and performs processing corresponding to each event. Also, the event processing unit 809 receives status transfer events of an apparatus or job or the like from the control API 218, and performs processing corresponding to each event. The DOM tree configuration that the DOM processing unit 804 manages has an event handler registered which corresponds to the various events for each object class and each object instance. The event processing unit 809 determines the object for the applicable event processing from the object group which the DOM processing unit 804 manages according to the generated event, and distributes the event. The object distributing the event executes various processing according to the algorithm of the event handler corresponding to the event thereof. The processing of the event handler includes updating of the DOM that the DOM processing unit 804 has, redrawing instructions as to the layout engine, HTTP request issuance instructions as to the protocol processing unit 801, and image processing apparatus function by a call-out of the control API 218.

The script interpreter 805 is an interpreter which interprets and executes a script such as Java script. The script may be embedded in the document or included in a separate file that is linked from the document, whereby operations as to the DOM are performed. The content provider can program dynamic behaviors of the provided document by the script.

Figure 8:
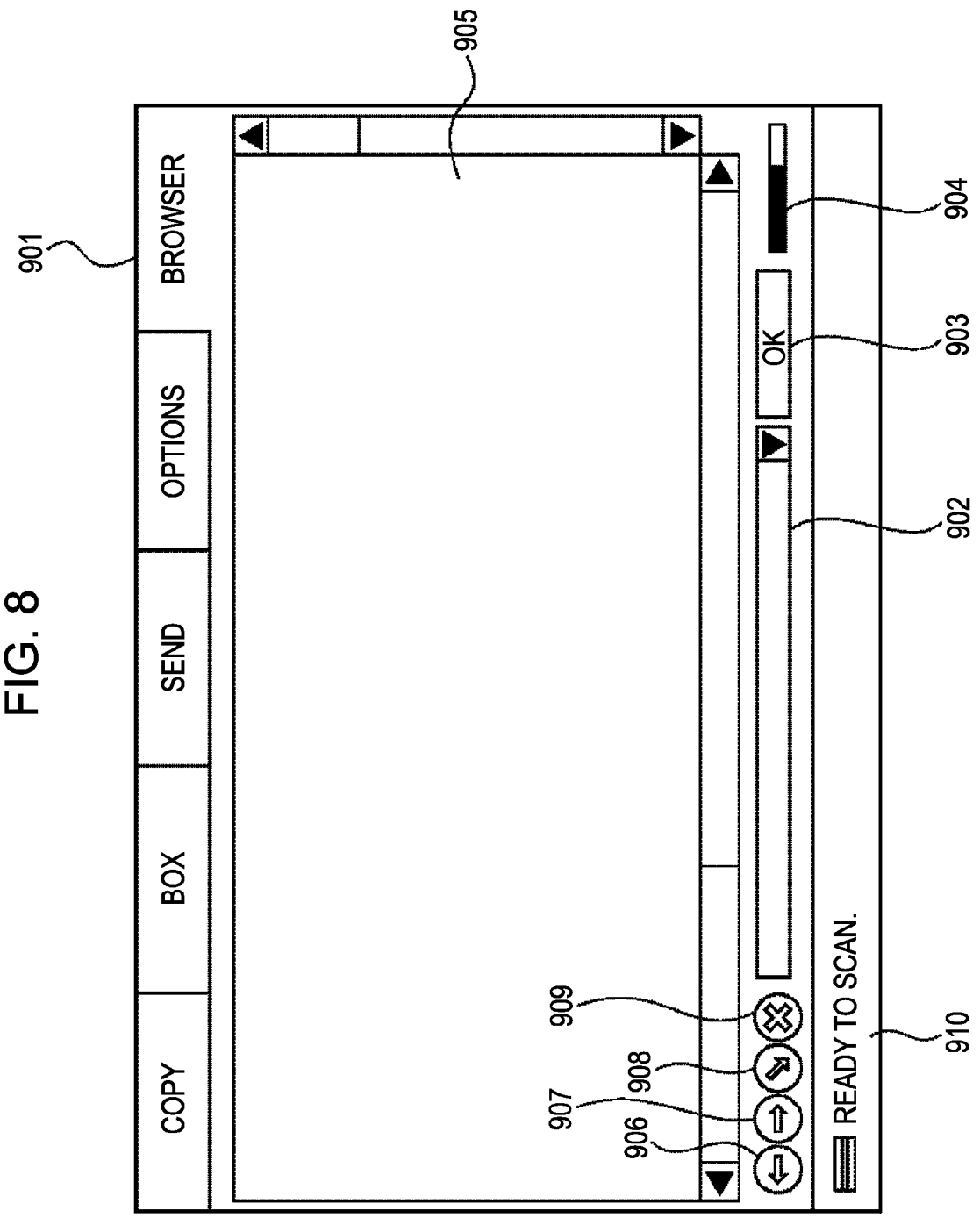
FIG. 8 is a diagram illustrating a screen configuration of a web browser according to an embodiment of the present invention.

Next, a screen configuration of the web browser displayed on the LCD 501 by the UI interface 201 will be described with reference to FIG. 8. FIG. 8 is a diagram showing a screen configuration of the web browser displayed on the LCD 501 by the UI interface 201.

A tab 901, URL input field 902, OK button 903, progress bar 904, content display region 905, and status region 910 are displayed on the screen of the web browser displayed on the LCD 501 with the UI interface 201. Also, a return button 906, advance button 907, reload button 908, and stop button 909 for instructing transfer of the screen on the web browser displayed on the LCD are displayed.

The tab 901 performs screen switching between the web browser function and other functions (copy, box, transmission, option). The URL input field 902 is a field to input a URL of a desired resource of the user, and when the user presses this field, a virtual full keyboard (unshown) for performing text input is displayed. The user can input a desired text string with the touch-panel keys modeling key tops arrayed on the virtual full keyboard.

The OK button 903 is a touch-panel key to confirm the input URL text string. Upon the URL confirmed, the web browser module 211 issues an HTTP request for performing obtaining of the resource. The progress bar 904 shows the progress status of the content obtaining processing with HTTP request response. The content display region 905 is a region that the obtained resource is displayed. The return button 906 is a touch-panel key to review the history of the content display and redisplay the content displayed before the content being displayed at the current point-in-time. The advance button 907 is a touch-panel key for returning to the content display that has been displayed after the content displayed at the point-in-time of pressing the button, when displaying the history of the content display. The reload button 908 performs re-obtaining and redisplaying of the content displayed at the current point-in-time. The stop button 909 is a touch-panel key to stop the content obtaining processing during execution.

The status region 910 is a region displaying a message from various functions of the image processing apparatus. Messages to prompt user warnings can be displayed on the status region 910 from the scanner or printer or other functions, even while the web browser screen is being displayed. Also, similarly messages can be displayed from the web browser function. The web browser function displays a URL text string of a link destination, content title text string, messages instructed by the script, and so forth.

Figure 9:
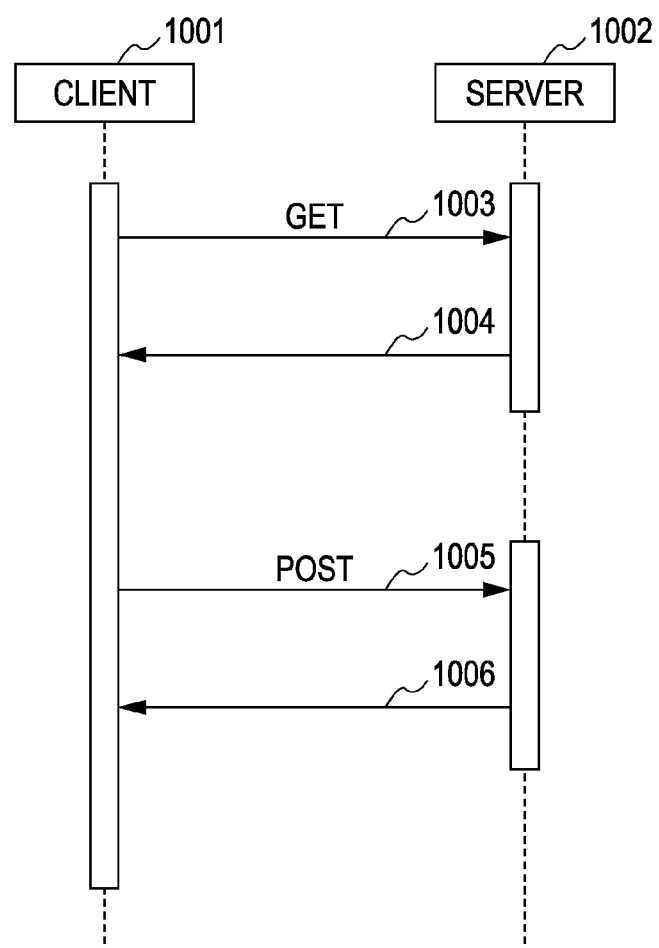
FIG. 9 is a sequence diagram illustrating processing flow of requests and responses by an HTTP protocol according to an embodiment of the present invention.

Next, the operations of the present embodiment will be described with reference to FIG. 9. FIG. 9 is a sequence diagram showing the flow of processing of request and response by an HTTP protocol according to the present embodiment. As shown in FIG. 9, the client 1001 is software to send an HTTP request and receive an HTTP response. Specifically, the client 1001 is equivalent to a web browser built in to the image processing apparatuses 110, 120, 130, or a general web browser which is operated with a PC (Personal Computer), PDA (Personal Digital Assistant), portable telephone and so forth. Also, the client 1001 may be various types of software that accesses a web server and uses a service or performs relay with a similar method as a web browser. The server 1002 is equivalent to an HTTP server which includes software that receives the HTTP request and performs processing corresponding thereto and further returns the HTTP response, which is software that operates on the server 155.

The client 1001 sends the HTTP request with one method of a GET method or POST method. In the case that the client 1001 sends the HTTP request 1003 as to the desired resource to the server 1002 with the GET method, the resource is generally specified with a URI (particularly URL) format. The server 1002 obtains or generates data corresponding to the resource specified with the HTTP request 1003, and returns this data with the HTTP response 1004. Thus, in the case that the specified resource corresponds to a static file, the server 1002 reads the relevant file from the file system of the server 155 for example and obtains such data. On the other hand, in the case that the specified resource corresponds to processing such as a CGI program or servlet, the server 1002 executes the relevant processing. The data generated as a result of the processing is then returned. For example, in the case that a resource for displaying a consumable goods catalog of the image processing apparatus is specified, software for electronic business transactions is executed. With this software, records of the latest prices and availability of sheets, toner, and parts are referenced from the database, and processing is performed to configure this information into HTML format or XML format and generate catalog document data.

With the client 1001, in the case that the data obtained with the HTTP response 1004 is in a format that can be displayed, the content is displayed. If the obtained data is an HTML document and so forth, obtaining and displaying new resources can be repeated simply by the user selecting link information which is embedded in the document displayed on the web browser as hypertext.

Next, a case wherein the HTTP request is sent with the POST method will be described. In the case that a form is included in an HTML document, the POST method is specified as the transmission method thereof (reference the HTML document in FIG. 10), first, the information input by the user in the form displayed with the web browser of the client 1001 is encoded. The encoded information, i.e. form input content is attached to the HTTP request 1005 and sent to the server 1002. With the server 1002, the specified resource receives data sent from the client 1001 and performs processing, generates an HTTP response 1006, and returns this to the client 1001.

Figures 10, 11:
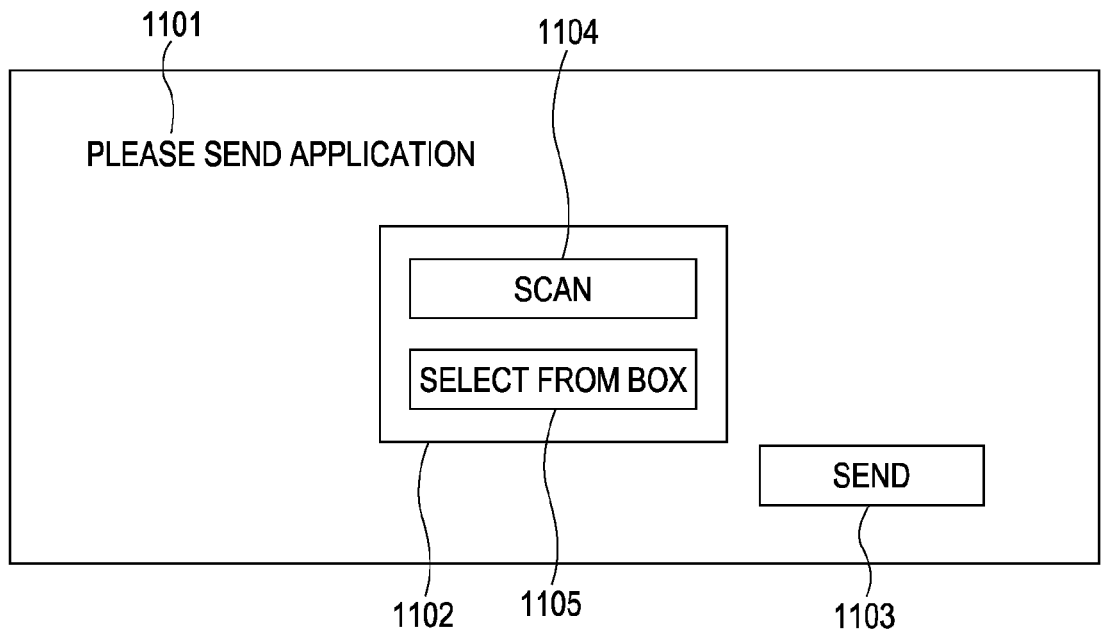
FIG. 10 is a diagram illustrating an example of an HTML document according to an embodiment of the present invention.
FIG. 11 is a diagram illustrating a screen example displayed on a web browser according to an embodiment of the present invention.

Next, a configuration of an HTML document including a form specifying the POST method as the sending method thereof and a screen displayed based on such HTML document will be described with reference to FIGS. 10 and 11. FIG. 10 is a diagram including a form, and showing an example of an HTML document specifying the POST method as the sending method thereof and FIG. 11 is a diagram showing a screen displayed on the content display region 905 of the web browser based on the HTML document in FIG. 10.

With the example of an HTML document which includes a form and wherein the sending method thereof is specified as a POST method, as shown in FIG. 10, a tag showing the start of the HTML element is included in the first row. A tag showing the start of a HEAD element is included in the second row, a TITLE element included in the HEAD element is included in the third row, and an ending tag of the HEAD element is included in the fourth row. A tag showing the start of a BODY element is included in the fifth row, and an H1 element is included is the sixth row. A tag showing the start of a FORM element is included in the seventh row. With this tag, information to the effect that the information input in this form is encoded with a "multipart/form-data" format, and sending is performed with the POST method as to a "regist.cgi" resource, is shown by the attributes. The eighth row shows a first INPUT element. With the first INPUT element, the attributes show that the name is "userfile" and the format is "file". The ninth row shows a second INPUT element. With the second INPUT element, information to the effect that the format is "submit", and the value is text string "send" is shown by the attributes. The tenth row shows the end of the FORM element. A tag showing the end of the BODY element is included in the eleventh row. A tag showing the end of the HTML element is included in the twelfth row.

With the client 1001, as shown in FIG. 11, a screen is displayed in the content display region 905 (shown in FIG. 8) based on the HTML document described above with the web browser thereof. With the screen displayed based on the above-described HTML document, the display corresponding to the H1 element of the third row in FIG. 10 becomes the display 1101. Also, the display corresponding to the INPUT element of the "file" form in the eighth row in FIG. 10 becomes the display 1102 in the rectangular region. The display corresponding to the INPUT element of the "submit" form in the ninth row in FIG. 10 becomes the display 1103.

Now, display objects 1104 and 1105 which are display objects unique to the web-browser of the image processing apparatus 110 are displayed in the display 1102 region. The display object 1104 is a display object for specifying the image data from the scanner 113 is input. The display object 1105 is a display object for specifying reading and inputting the image data from the box region in the HDD 304.

Figure 12:
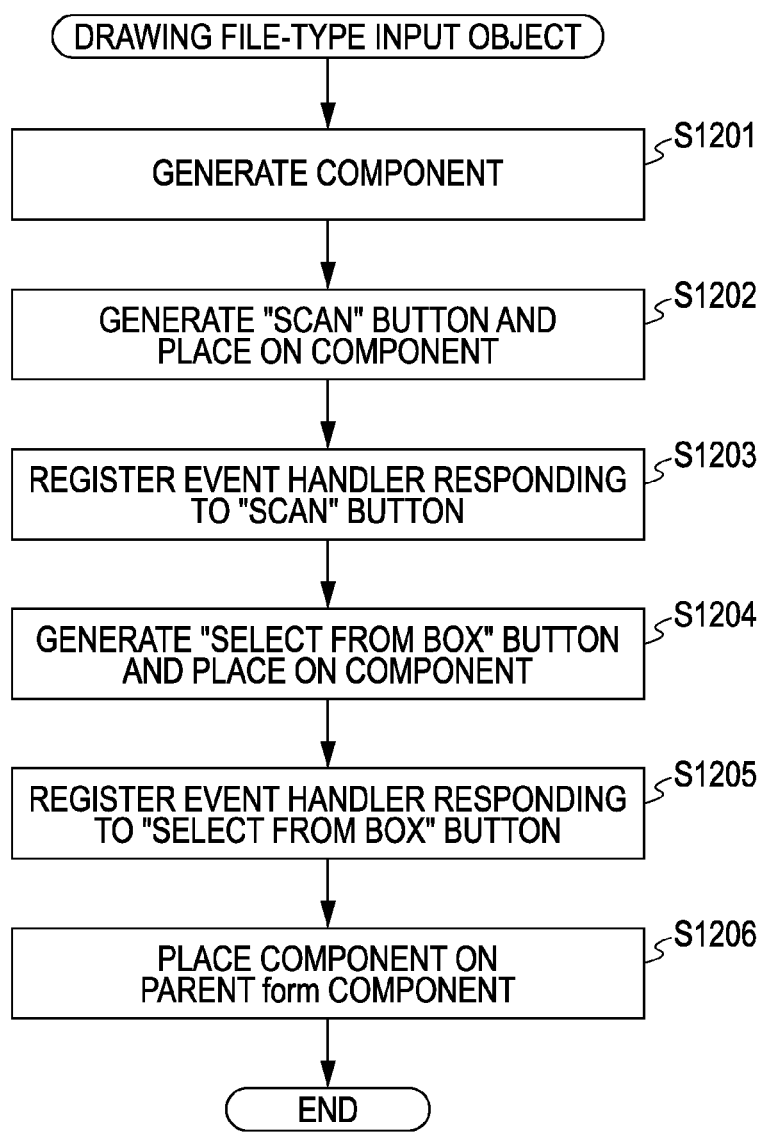
FIG. 12 is a flowchart describing procedures for layout processing of a display object according to an embodiment of the present invention.

Next, layout processing of an object corresponding to an INPUT element in "file" form which is performed with the web browser of the image processing apparatus 110 will be described with reference to FIG. 12. FIG. 12 is a flowchart showing procedures of the layout processing of the layout processing of the display object corresponding to the INPUT element in "file" form which is performed with the web browser of the image processing apparatus 110. With the present layout processing, description is given as the layout being generated corresponding to the display 1102 of the screen shown in FIG. 11.

The CPU 301 generates a component object serving as an increment of the layout processing in step S1201, as shown in FIG. 12. Following this, in step S1202, the CPU 301 generates a button corresponding to the display object 1104, i.e. a "scan" button, and disposes this on a component.

Next, in step S1203, the CPU 301 registers reading processing by the scanner 113 as an event handler which starts when an event occurs that the generated "scan" button is pressed.

In the following step S1204, a button corresponding to the display object 1205, i.e. "select from box" button is generated, and disposed on a component. In step S1205, the CPU 301 registers readout processing of the image data from the HDD 304 as an event handler which starts when an event occurs that the generated "select from box" button is pressed.

In step S1206, the CPU 301 disposes the component on a component object corresponding to the FORM element which is a parent component of the component herein. With a similar procedure, a tree configuration is generated which expresses the inclusive relation of the component objects corresponding to the various elements, and the screen display layout is performed by recursively processing this tree.

Figure 26:
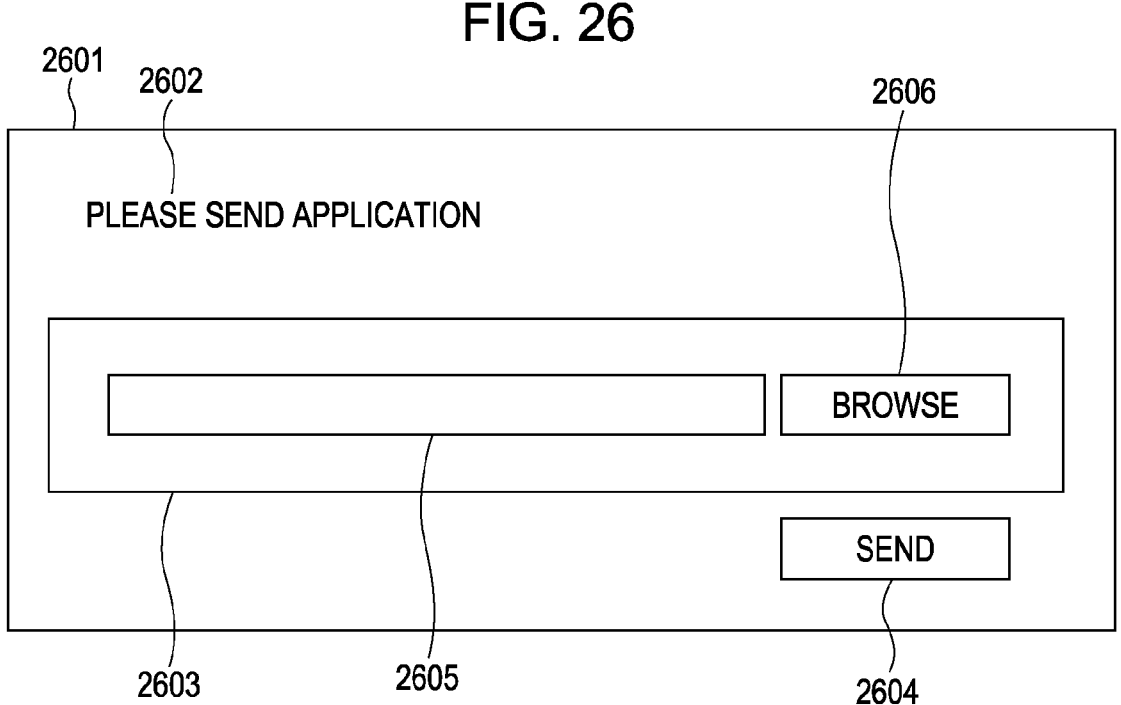
FIG. 26 is a diagram illustrating a screen example displayed on a conventional web browser.

Thus, instead of the screen displayed with a general browser as a screen corresponding to an HTML document described in a form for requesting image data input (FIG. 26), with the present embodiment the screen shown in FIG. 11 is displayed.

Figure 13:
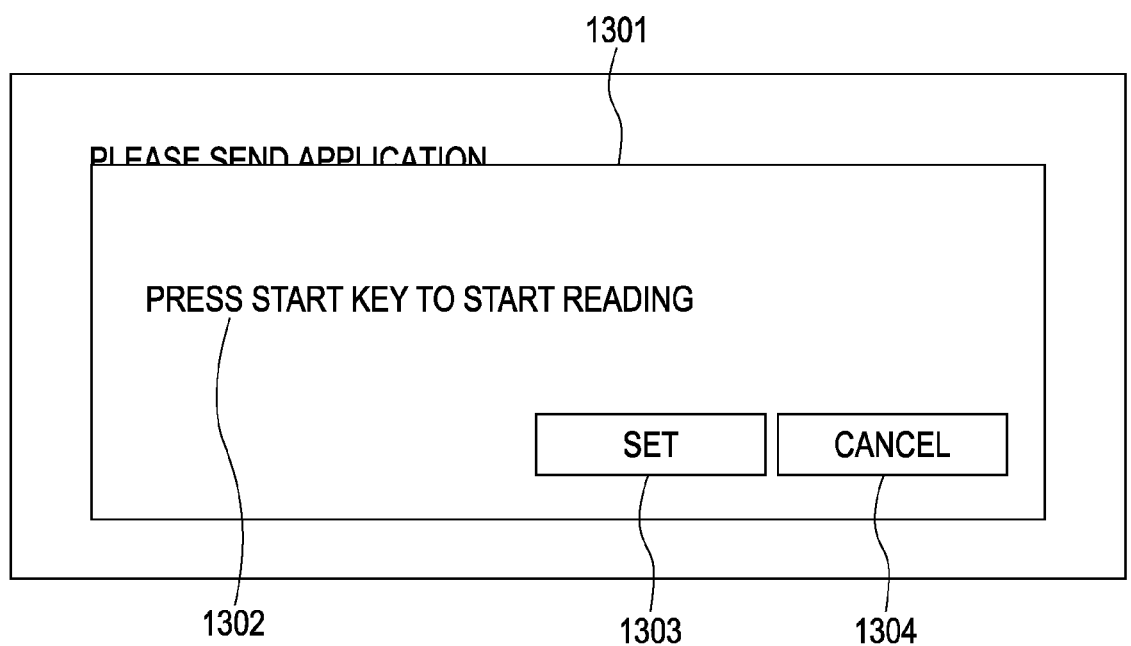
FIG. 13 is a diagram illustrating a screen example displayed on a web browser according to an embodiment of the present invention.

Next, a dialog window, displayed in the case that the user has selected inputting the image data from the scanner 113, is described with reference to FIG. 13. FIG. 13 is a diagram showing an example of a dialog window displayed on a web browser for reading processing by the scanner 113.

Upon the display object 1104 in FIG. 11, i.e. the "scan" button being pressed, as shown in FIG. 13, the dialog window 1301 is displayed on the content display region 905 of the web browser. A message 1302, button 1303, and button 1304 are displayed on the dialog window 1031.

The message 1302 is for notifying that the reading processing will be started with the pressing of the start key 505. The button 1303 is a setting button, and is a button for displaying a dialog box (unshown) to perform scan parameter settings such as reading resolution and data formats. The button 1304 is a cancel button, and is a button to stop the reading processing and return to the screen shown in FIG. 11.

Figure 14:
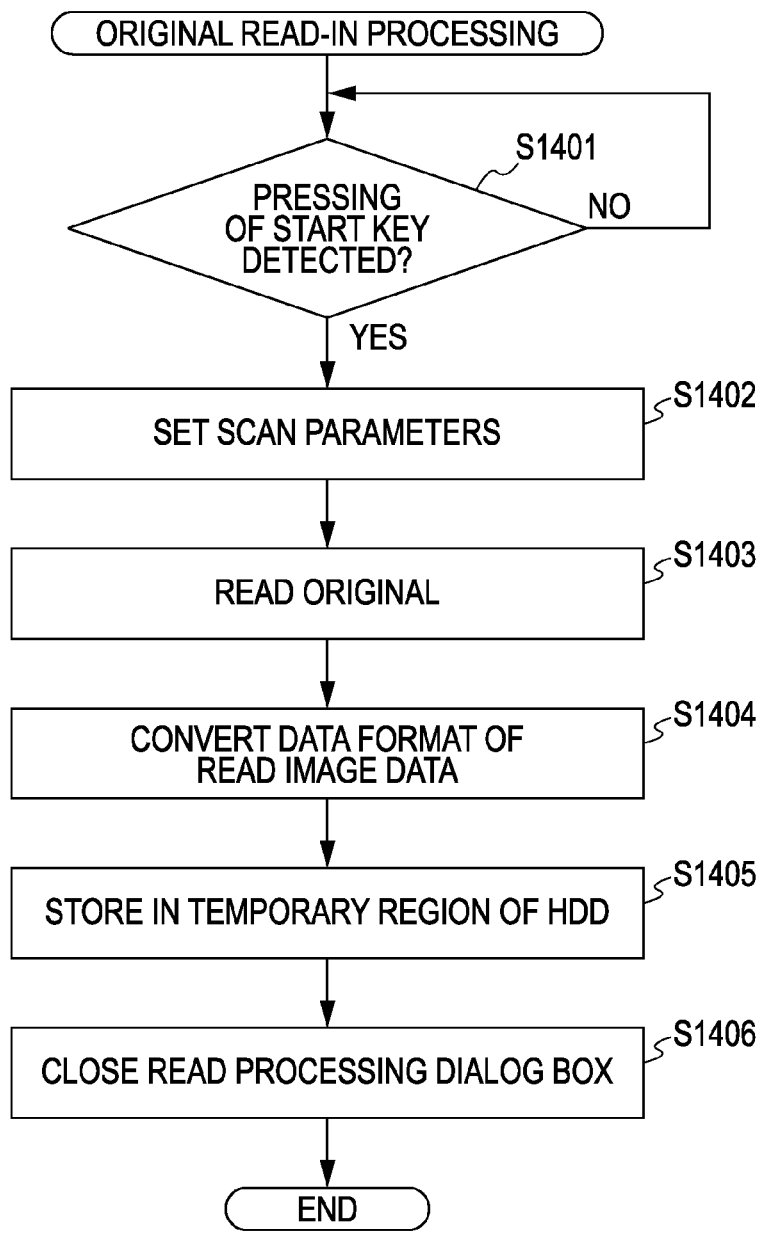
FIG. 14 is a flowchart describing procedures of processing for inputting image data output by a scanner reading an image on an original.

Next, the processing performed by the CPU 301 will be described with reference to FIG. 14. In step S1401, whether or not the start key 50 is pressed is detected. Upon the pressing of the start key 505 being detected, the flow is advanced to step S1402, a scan parameters such as reading resolution and data format are set in the control API 218. Next the control API 218 is called out in step S1403, and the scan job is started. Thus, reading of the original is performed in step S1403.

In step S1404, the data format of the read image data is converted to the data format set in step S1402. In the following step S1405, image data is stored in a temporary region of the HDD 304. In step S1406, the reading processing dialog box is closed and returns to the screen shown in FIG. 11, and the processing is ended.

Note that upon returning to the screen in FIG. 11, the display object 1104 is reverse-displayed, and the user can recognize that the image data wherein the image is read from the original and output is stored in the temporary region of the HDD 304.

Figure 15:
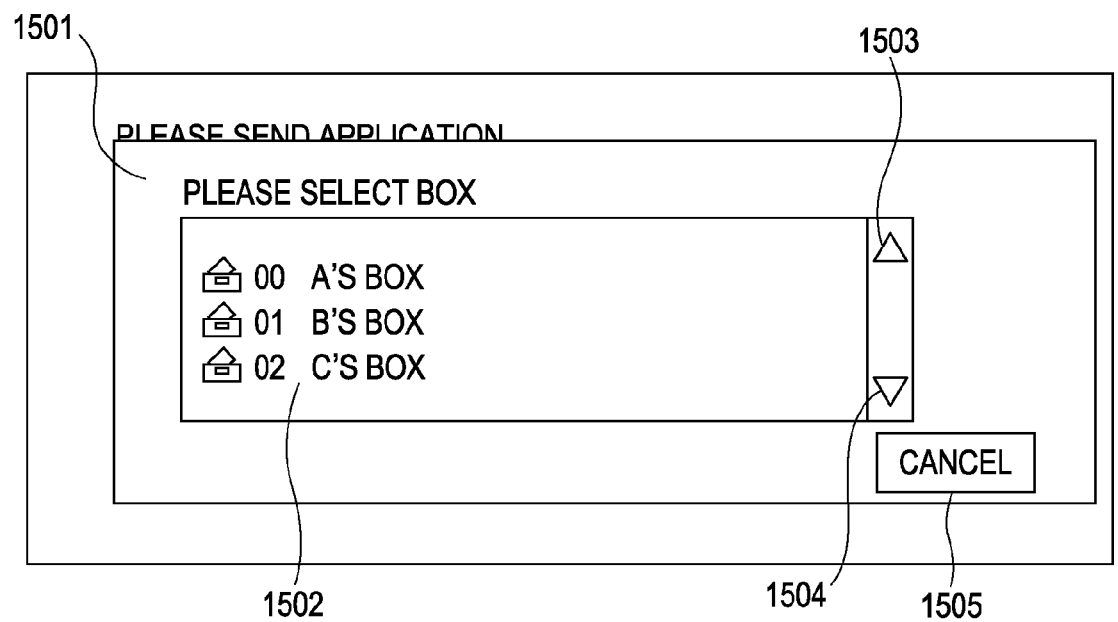
FIG. 15 is a diagram illustrating a screen example displayed on a web browser according to an embodiment of the present invention.

Next, a dialog window, displayed in the case that the user selects reading image data from the box region in the HDD 304 and inputting this as image data to be sent in the web browser module 211, will be described with reference to FIG. 15. FIG. 15 is a diagram showing an example of a dialog window displayed on the web browser for reading processing from the box region of the HDD 304.

Upon the display object 1105 in FIG. 11, i.e. the "select from box" button being pressed, as shown in FIG. 15, the dialog window 1501 is displayed on the content display region 905 of the web browser. A box selecting cell 1502, scroll buttons 1503 and 1504, and a cancel button 1505 are displayed on the dialog window 1501.

The box selecting cell 1502 displays information that each row relates to one box (box number, box name assigned to the box). Upon one of the rows being selected by the user, a screen is displayed showing a menu of the documents stored in the selected box. Upon the scroll buttons 1503 or 1504 being pressed, the range of the box displayed on the box selecting cell is changed. Upon the cancel button 1505 being pressed, the processing is stopped and returns to the screen in FIG. 11.

Figure 16:
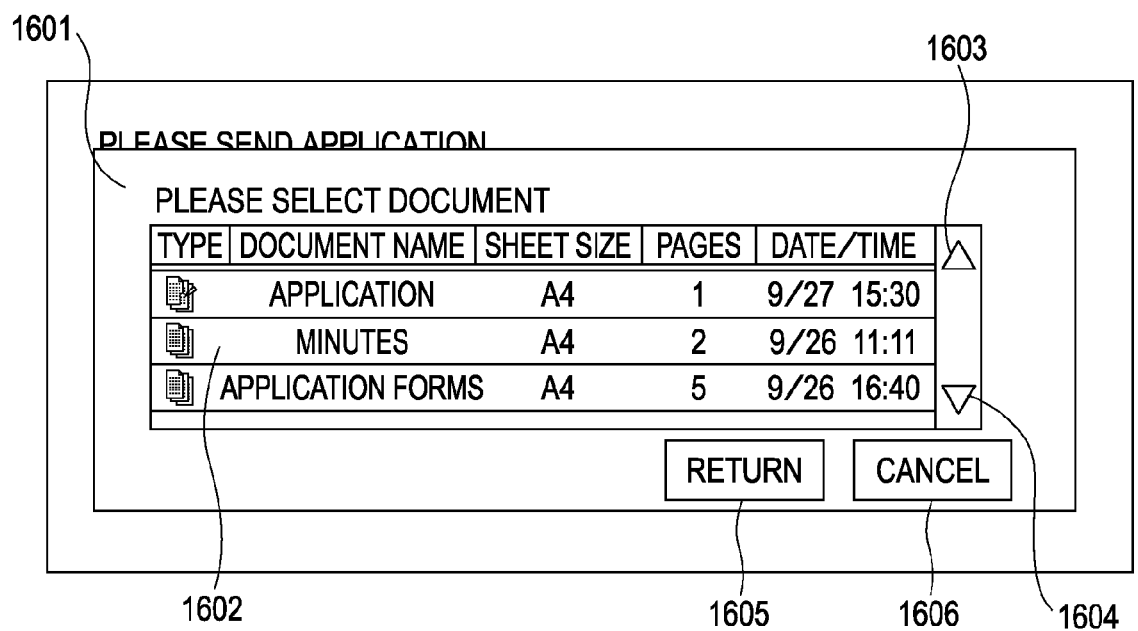
FIG. 16 is a diagram illustrating a screen example displayed on a web browser according to an embodiment of the present invention.

Next, FIG. 16 shows a screen displaying a menu of documents stored in the box selected with the screen in FIG.

15. As shown in FIG. 16, a dialog window 1601 is displayed on the content display region 905 of the web browser. A document selecting cell 1602, scroll buttons 1603 and 1604, a return button 1605, and a cancel button 1606 are displayed on the dialog window 1601.

The document selecting cell 1602 displays information relating to the document stored in the selected box (document type, document name, paper size, number of pages, date/time stored, and so forth) in one row for each document. Upon the user selecting one of the rows, the selected document is determined to be the sending document, and the screen is returned to the screen in FIG. 11. In this case, in the screen in FIG. 11, a display object 1105 is reverse displayed, whereby the user can confirm that the box document is selected.

Upon the scroll button 1603 or 1604 being pressed, the range of documents displayed in the document selecting cell 1602 is changed. Button 1605 is a return button, and returns the screen to the screen in FIG. 15. Upon the cancel button 1606 being pressed, the processing is stopped and the screen is returned to the screen in FIG. 11.

Note that upon the display object 1105 being selected after the image data that the scanner 113 has output is stored in the temporary region of the HDD 304, the data stored in the temporary region is deleted and the reverse display of the display object 1104 is cancelled. Also upon the display object 1104 being selected in a state wherein the display object 1105 is reverse displayed, i.e. a state wherein the document in the box is selected, the selection of the selected box document is cancelled, and the reverse display of the display object 1105 is cancelled. That is to say, that which is set later becomes valid here.

Figure 17:
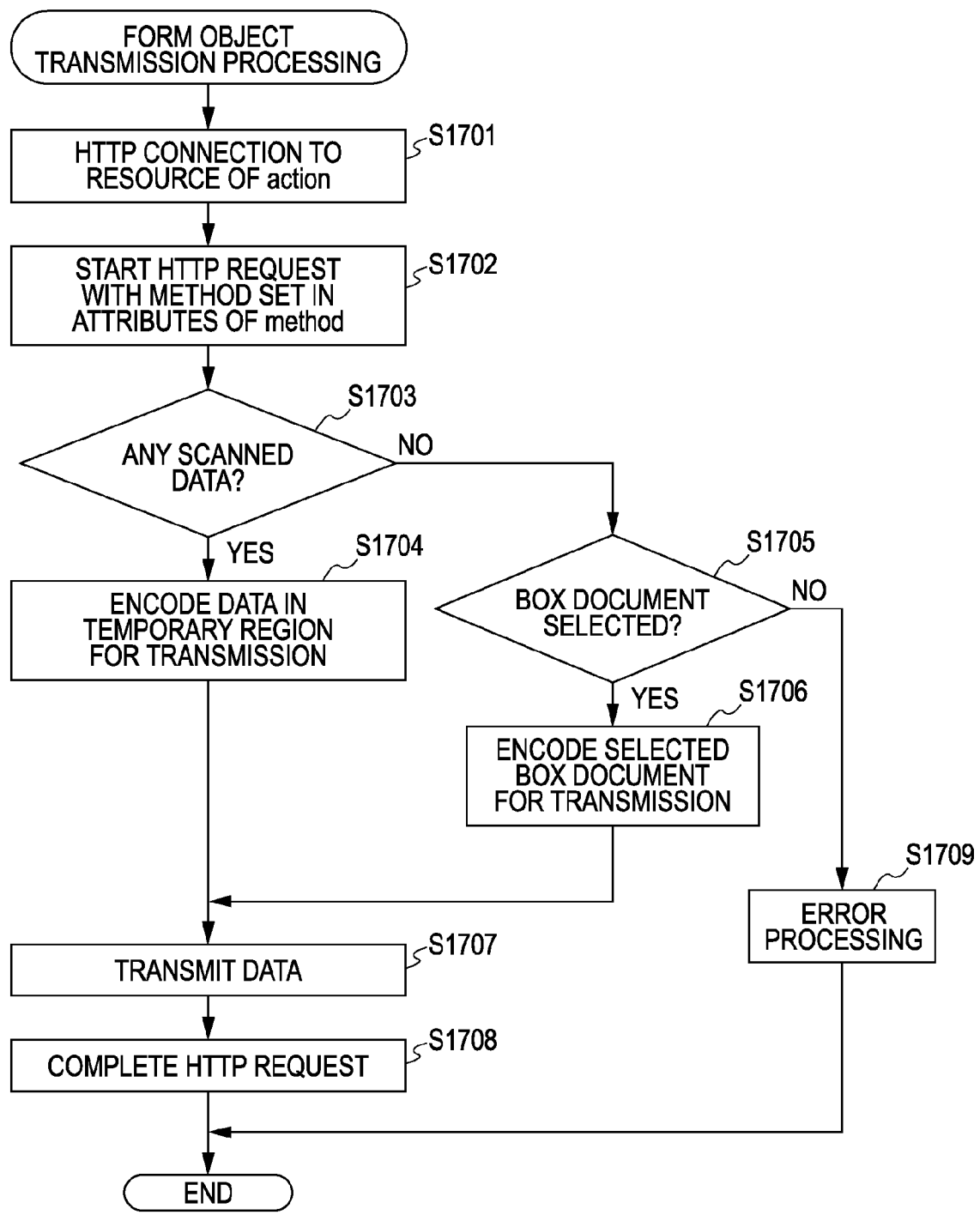
FIG. 17 is a flowchart describing procedures for submit processing according to an embodiment of the present invention.

Next, form submit processing which is performed by the web browser of the image processing apparatuses 110, 120, and 130 are described with reference to FIG. 17. FIG. 17 is a flowchart showing procedures for form submitting processing which is performed by the web browser of the image processing apparatuses 110, 120, and 130. The present processing is executed when an input event occurs for an object corresponding to an INPUT element in "submit" form. That is to say, in the case that the "send" button of the display object 1103 is pressed, the present processing is executed regarding the FORM element including the INPUT element thereof. Note that the processing is performed distributed to multiple objects, but the details will be omitted and described as one string of procedures.

First, in step S1701 as shown in FIG. 17, the CPU 301 performs HTTP connection as to a URI resource set in the "action" attribute of the object corresponding to the FORM element. (In the case of HTTP 1.1, if the connection to the server is already established, this step can be omitted.) Next, in step S1702, the CPU 301 starts the HTTP request with the send method set in the "method" attribute of the object corresponding to the FORM element. POST sending is set as the sending method here.

Next, in step S1703, the CPU 301 determines whether or not there is any image data output from the scanner 113 in the temporary region of the HDD 304. If image data is stored, in step S1704 the image data is encoded to match the encoding format (multipart/form-data) set in the "enctype" attribute of the FORM element.

In the case that image data is not stored, determination is made in step S1705 as to whether a document in the box region of the HDD 304 is selected. If a document is selected, in step S1706 this is encoded to match the encoding format (multipart/form-data) set in the "enctype" attribute of the FORM element.

Next, the CPU 301 performs sending of the encoded image data in step S1707. Further, in step S1708, the CPU 301 completes the HTTP request and ends the present processing.

Note that in the case that the determinations in step S1703 and step S1705 are both negative, i.e. in the case that image data is not stored in the temporary region of the HDD 304 and a document in the box region is not selected, the flow is advanced to step S1709. In step S1709, an error message is displayed on the LCD 501 or the like to notify the user of the error.

Thus, according to the present embodiment, a first display object for instructing inputting image data with a first input unit and a second display object for instructing inputting image data with a second input unit are displayed on the same screen. Thus, the ASP only has to perform an image obtaining request with the web page with a general-use form that includes a form element to find a file upload. On the other hand, a user of the image processing apparatus can easily select whether to scan and send an original by accessing the ASP server and obtaining a general-use web page, or whether to select the document stored in the box, from the same screen. That is to say, handling of the image processing apparatus is easier, particularly for users unaccustomed to web applications.

Figure 18:
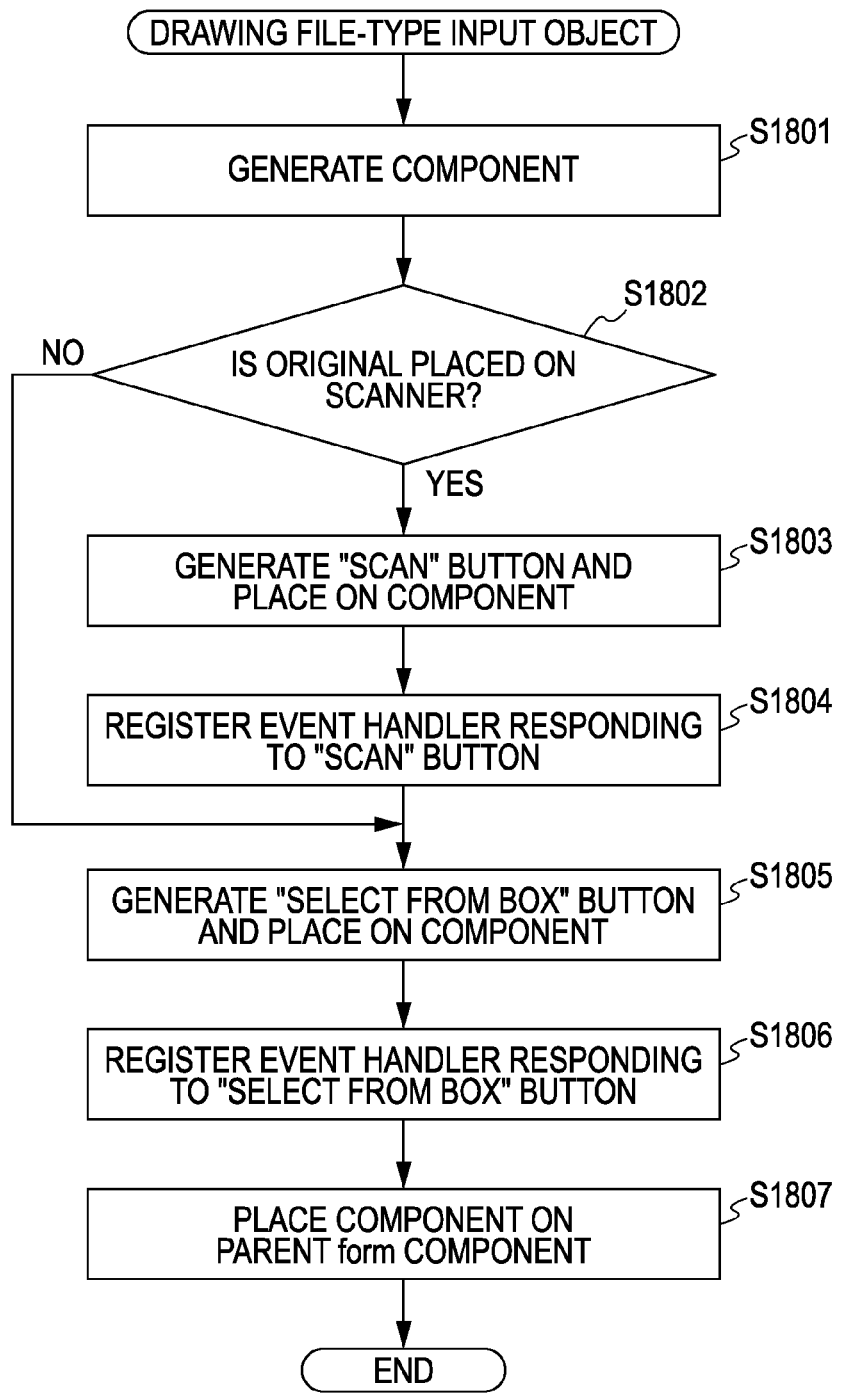
FIG. 18 is a flowchart describing procedures for layout processing of a display object according to an embodiment of the present invention.

Next, a second embodiment according to the present invention will be described with reference to FIG. 18. FIG. 18 is a flowchart showing procedures for layout processing of an object corresponding to an INPUT element of a file form performed by a web browser relating to the second embodiment of the present invention. The second embodiment has the same configuration as the first embodiment except for the processing in FIG. 12, so the description thereof will be omitted here.

First, in step S1801 as shown in FIG. 18, the CPU 301 generates a component object serving as an increment of the layout processing. Next, in step S1802, the CPU 301 determines whether or not an original is placed on the scanner 113. In the case determination is made that an original is placed thereupon, a "scan" button is generated in step S1803, and disposed on the component.

Next, in step S1804, the CPU 301 registers reading processing by the scanner 113 as an event handler which starts when an event occurs that the generated "scan" button is pressed.

In the following step S1805, the CPU 301 generates a "select from box" button, and disposes this on the component. In step S1806, the CPU 301 registers readout processing of the image data from the HDD 304 as an event handler which starts when an event occurs that the generated "select from box" button is pressed.

In step S1807, the CPU 301 disposes the component on a component object corresponding to the FORM element which is a parent component of the component herein. With a similar procedure, a tree configuration is generated which expresses the inclusive relation of the component objects corresponding to the various elements, and the screen display layout is performed by recursively processing this tree.

FIG. 19 shows an example of a screen displayed on the content display region 905 in the case that there are no originals placed on the scanner 113 with the above-described processing. In the screen shown in FIG. 19, as compared to the screen shown in FIG. 11, it is clear that the "scan" button is not displayed and only the "select from box" button is displayed. Note that in the case an original is placed on the scanner 113, the screen shown in FIG. 11 is displayed.

Note that in the case no original is placed on the scanner 113, the "scan" button is not displayed here, but an arrangement may be made wherein the button is inactivated in a displayed state, i.e. the button cannot be selected.

Thus, according to the second embodiment, the state of the image processing apparatus is discriminated, and according to the discrimination results herein, an appropriate input method is selected, and a display object according to the selected input method is displayed, thereby improving usability of the user.

Figure 20:
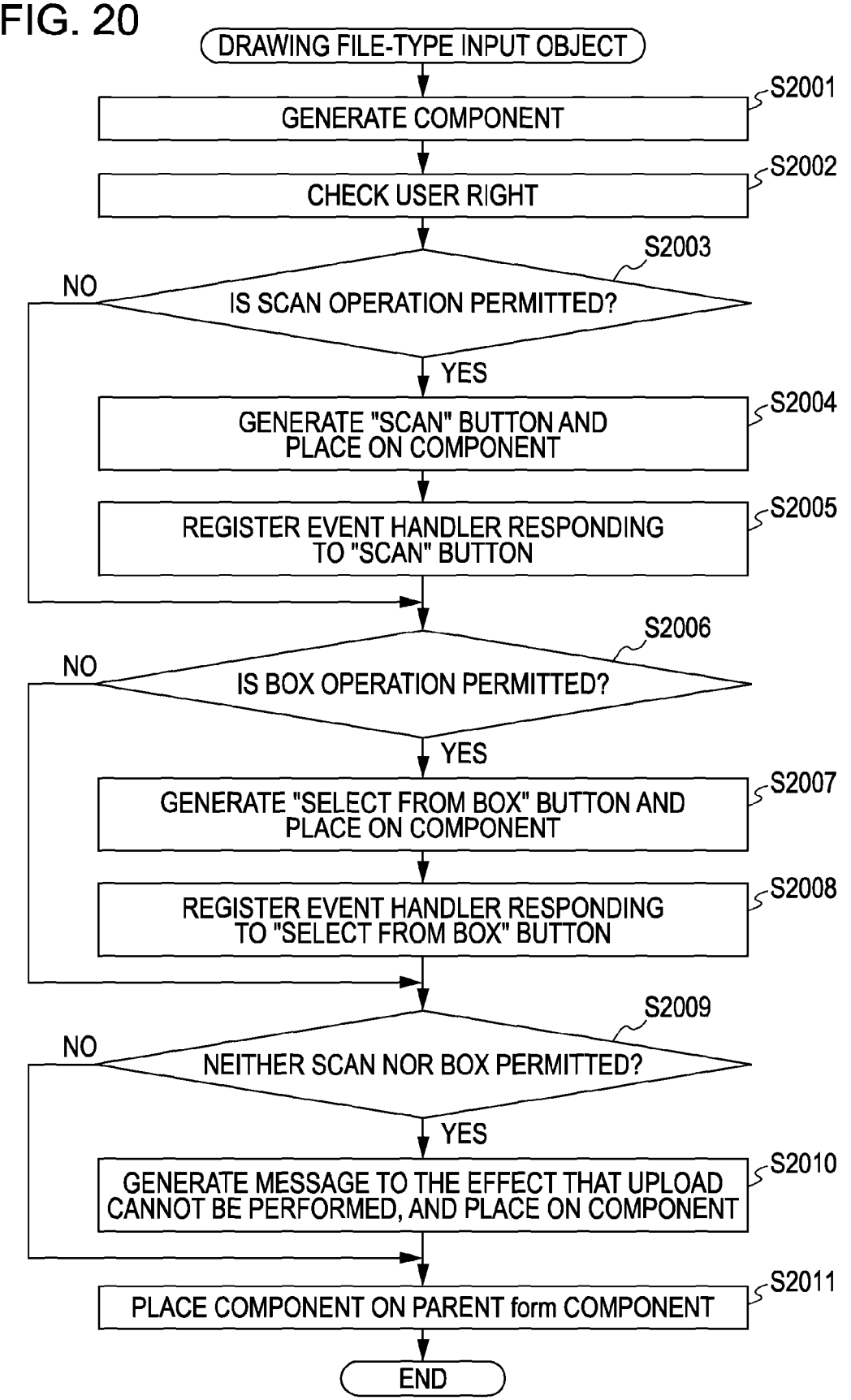
FIG. 20 is a flowchart describing procedures for layout processing of a display object according to an embodiment of the present invention.

Next, a third embodiment according to the present invention will be described with reference to FIG. 20. FIG. 20 is a flowchart showing procedures for layout processing of an object corresponding to an INPUT element of a file form performed by a web browser relating to the third embodiment of the present invention. The third embodiment has the same configuration as the first embodiment except for the processing in FIG. 12, so the description thereof will be omitted here.

First, in step S2001, as shown in FIG. 20, the CPU 301 generates a component object to serve as an increment of the layout processing. Next in step S2002, the CPU 301 inquires about right information of the user operating the image processing apparatus as to the user right information database. For each of multiple input units (e.g. scanner 113 and HDD 304) which are mutually different that the image processing apparatus 100 has, the user right information database holds information that can specify users permitted to use the input units. Note that the user right information database may be stored in the memory in the image processing apparatus 100, or may be in a separate location on the network.

A user operating the image processing apparatus inputs a user ID and password via the screen shown in FIG. 21 in the event of starting to operate the image processing apparatus. The CPU 301 distinguishes the user operating the image processing device based on the input user ID and password.

Further, using the input user ID, the above-described right information database is searched, and the input unit that the user operating the image processing apparatus is permitted to use is specified.

Returning to FIG. 20, in step S2003, the CPU 301 determines whether or not the user operating the image processing apparatus is a user permitted for scanning operations. That is to say, determination is made here as to whether the user operating the image processing apparatus is permitted to use the scanner 113.

In the case determination is made that the user is permitted to use the scanner 113, the "scan" button is generated in step S2004 and is disposed on the component. Next, in step S2005, the CPU 301 registers reading processing by the scanner 113 as an event handler which starts when an event occurs that the generated "scan" button is pressed.

In the following step S2006, the CPU 301 determines whether the user operating the image processing apparatus is a user permitted for box operations. That is to say, determination is made here as to whether the user operating the image processing apparatus is permitted to use the box (HDD 304).

In the case determination is made that the user is permitted to use the box, the "select from box" button is generated in step S2007 and is disposed on the component. Next, in step S2008, the CPU 301 registers reading processing of image data from the HDD 304 as an event handler which starts when an event occurs that the generated "select from box" button is pressed.

Next in step S2009, the CPU 301 determines whether or not the user is permitted for neither scanning operations nor box operations. Upon determining that the user is not permitted for either, in step S2010 the CPU 301 generates a message to the effect that the image data cannot be uploaded, and disposes this on the component.

In step S2011, the CPU 301 disposes the component on a component object corresponding to the FORM element which is a parent component of the component herein. With a similar procedure, a tree configuration is generated which expresses the inclusive relation of the component objects corresponding to the various elements, and the screen display layout is performed by recursively processing this tree.

With the above processing, FIG. 22 shows an example of a screen displayed on the content display region 905 in the case that a user not permitted for either scanning operations or box operations performs an operation. Note that in the case of a user permitted to use both scanning operations and box operations, the same screen as shown in FIG. 11 is displayed. Also, in the case of a user wherein scanning operations are limited and box operations are permitted, the same screen as that shown in FIG. 19 is displayed.

Thus, according to the third embodiment, a display object according to the user operating the image processing apparatus is displayed, thereby improving usability by the user.

Figure 23:
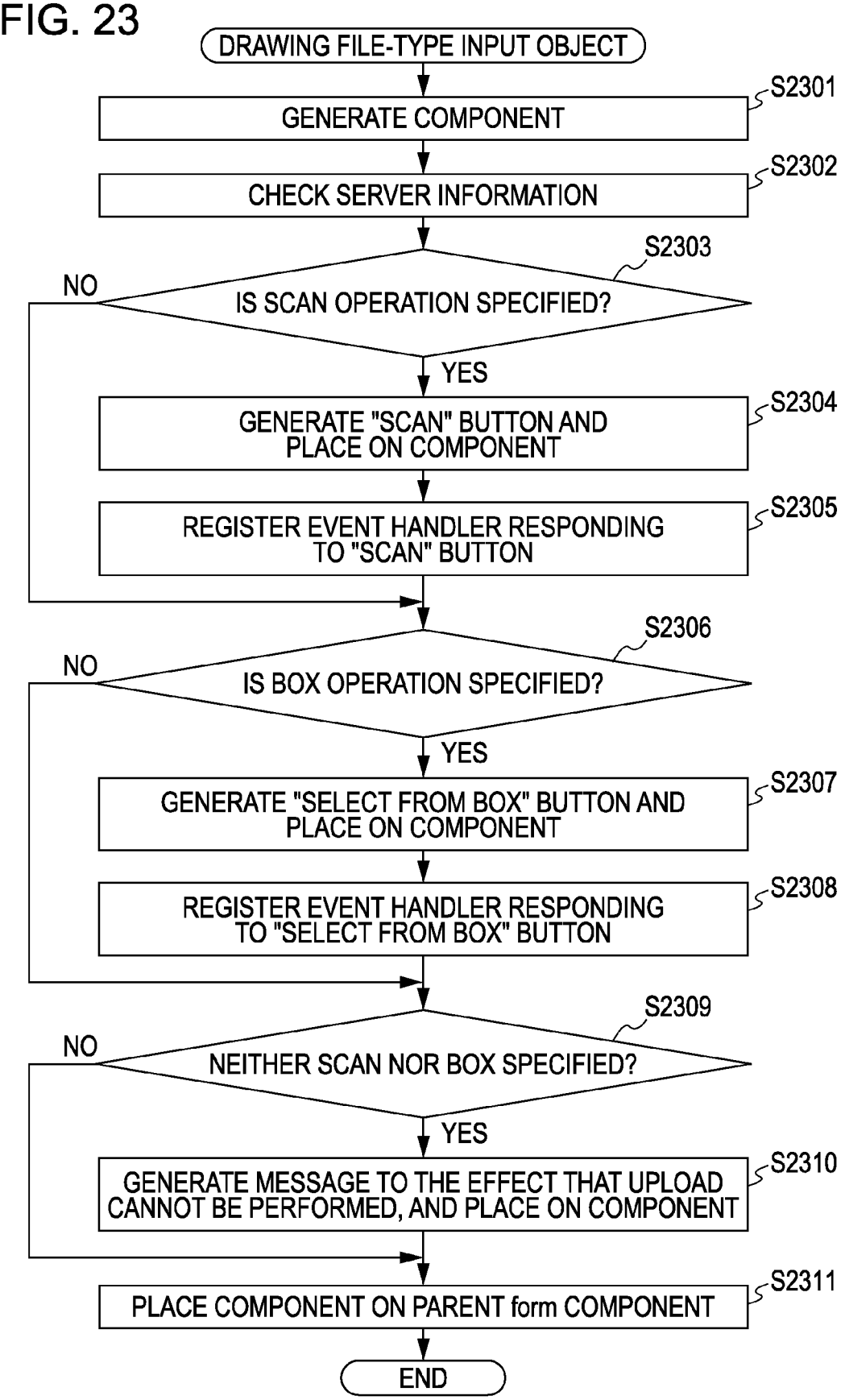
FIG. 23 is a flowchart describing procedures for layout processing of a display object according to an embodiment of the present invention.

Next, a fourth embodiment according to the present invention will be described with reference to FIG. 23. FIG. 23 is a flowchart showing procedures for layout processing of an object corresponding to an INPUT element of a file form performed by a web browser relating to the fourth embodiment of the present invention. The fourth embodiment has the same configuration as the first embodiment except for the processing in FIG. 12, so the description thereof will be omitted here.

First, in step S2301, as shown in FIG. 23, the CPU 301 generates a component object to serve as an increment of the layout processing. Next in step S2302, the CPU 301 inquires about information relating to a server at the sending destination of the form as to a server information database. Information showing the input method specified as an input method of the sending image is stored in the server information database for each server. Note that the server information database may be stored in the memory in the image processing apparatus, or may be in a separate location on the network.

In step S2303, the CPI 301 determines whether or not the scan input has been specified based on the server information. In the case determination is made that scan input has been specified, the "scan" button is generated in step S2304 and is disposed on the component. Next, in step S2305, the CPU 301 registers reading processing by the scanner 113 as an event handler which starts when an event occurs that the generated "scan" button is pressed.

In the following step S2306, the CPU 301 determines whether or not box input has been specified based on the server information. In the case determination is made that box input has been specified, in step S2307 the CPU 301 generates the "select from box" button and disposes this on the component. Next, in step S2308, the CPU 301 registers reading processing of image data from the HDD 304 as an event handler which starts when an event occurs that the generated "select from box" button is pressed.

Next in step S2309, the CPU 301 determines whether or not neither scanning input nor box input is specified. Upon determining that neither is specified, in step S2310 the CPU 301 generates a message to the effect that the upload cannot be performed, and disposes this on the component.

In step S2311, the CPU 301 disposes the component on a component object corresponding to the FORM element which is a parent component of the component herein. With a similar procedure, a tree configuration is generated which expresses the inclusive relation of the component objects corresponding to the various elements, and the screen display layout is performed by recursively processing this tree.

Thus, according to the fourth embodiment, a display object according to the server serving as the sending destination of the image data is displayed, thereby improving usability by the user.

Figure 24:
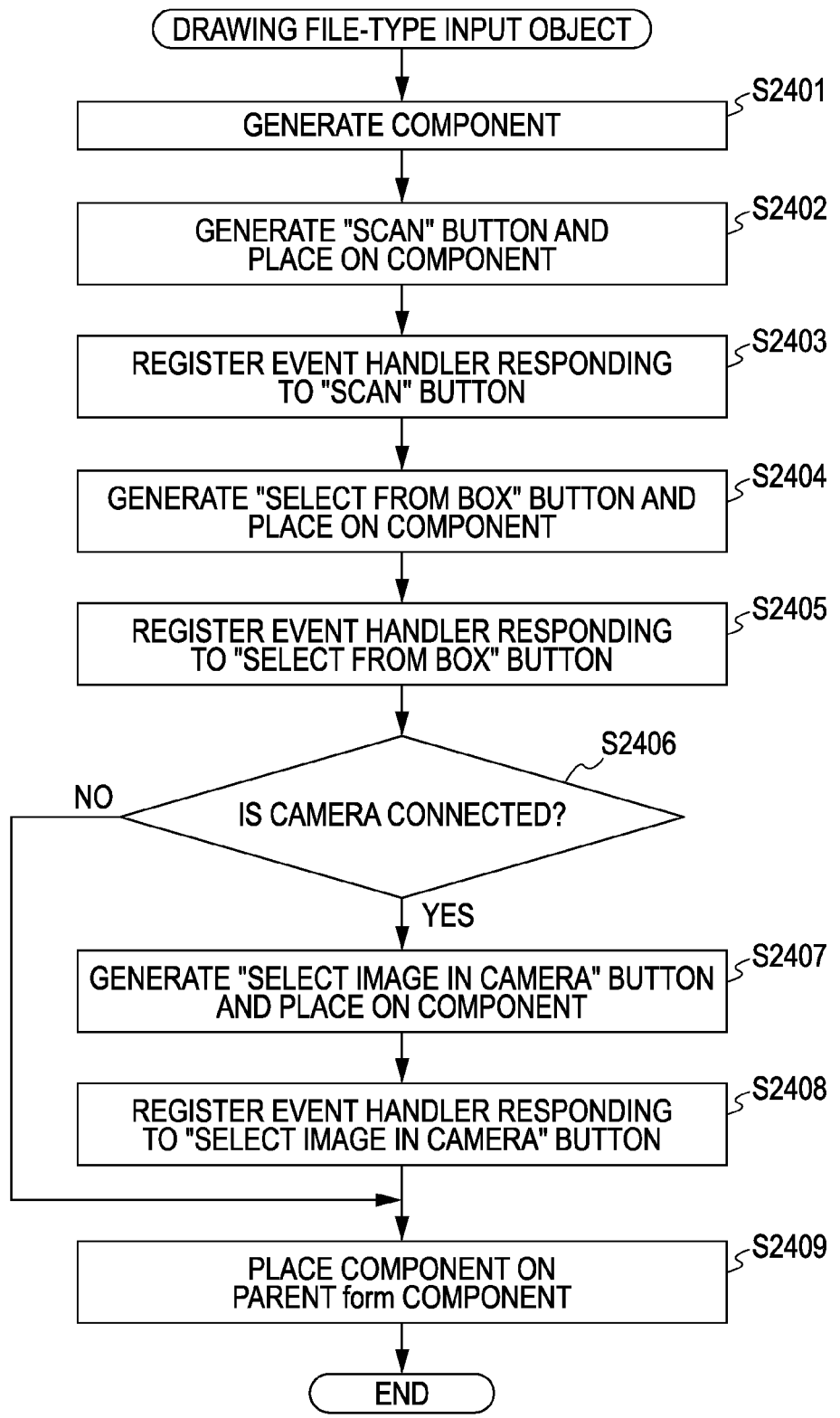
FIG. 24 is a flowchart describing procedures for layout processing of a display object according to an embodiment of the present invention.

Next, a fifth embodiment according to the present invention will be described with reference to FIG. 24. FIG. 24 is a flowchart showing procedures for layout processing of an object corresponding to an INPUT element of a file form performed by a web browser relating to the fifth embodiment of the present invention. The fifth embodiment has the same configuration as the first embodiment except for the processing in FIG. 12, so the description thereof will be omitted here.

First, in step S2401, as shown in FIG. 24, the CPU 301 generates a component object to serve as an increment of the layout processing. Next in step S2402, the CPU 301 generates a "scan" button disposes this on the component. Next, in step S2403, the CPU 301 registers reading processing by the scanner 113 as an event handler which starts when an event occurs that the generated "scan" button is pressed.

In the following step S2404, the CPU 301 generates a "select from box" button and disposes this on the component. In step S2405, the CPU 301 registers reading processing of image data from the HDD 304 as an event handler which starts when an event occurs that the generated "select from box" button is pressed.

Next, the CPU 301 determines in step S2406 whether or not a digital camera 319 is connected to the camera interface 318. In the case determination is made that a digital camera is connected, the CPU 301 generates a "select data in camera" button in step S2407 and disposes this on the component. Next in step S2408, the CPU 301 registers image data acquisition processing from the digital camera as an event handler which starts when an event occurs that the generated "select data in camera" button is pressed.

In step S2409, the CPU 301 disposes the component on a component object corresponding to the FORM element which is a parent component of the component herein. With a similar procedure, a tree configuration is generated which expresses the inclusive relation of the component objects corresponding to the various elements, and the screen display layout is performed by recursively processing this tree.

Figure 25:
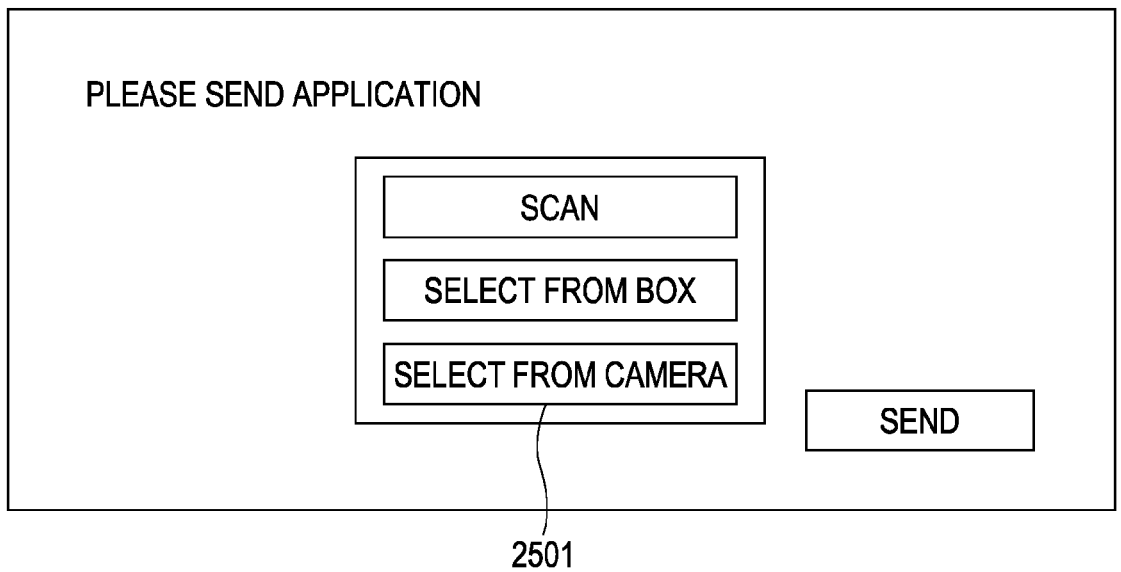
FIG. 25 is a diagram illustrating a screen example displayed on a web browser according to an embodiment of the present invention.

A screen example displayed in the content display region 905 in the case that a digital camera is connected with the above processing is shown in FIG. 25. When the display object 2501 is pressed, a screen (unshown) for obtaining the image data sent from the image within the connected digital camera is displayed.

Note that an example is given with the fifth embodiment of a case that the digital camera is connected, but an arrangement may be made wherein buttons for selecting image data in an external peripheral device (USB memory and so forth) connected to a device other than a digital camera are generated and layout performed.

Thus, according to the fifth embodiment, the display object is displayed according to whether or not a portable terminal attached externally to the image processing apparatus is connected, thereby improving usability by the user.

The above embodiments have been described as examples, but the present invention can have a system, apparatus, method, program, or storage medium (recording medium) and so forth as an embodiment. Specifically, the present invention may be applied to a system configured from multiple devices, or may be applied to an apparatus made up of one device.

Note that the present invention supplies a software program that realizes the functions of the above-described embodiments (a program corresponding to the flowchart shown in the diagrams with the embodiments) directly, or from a distance, to the system or apparatus. The case in which a computer of the system or apparatus thereof reads out and executes the supplied program code is also included.

Accordingly, in order to realize the function processing of the present invention with a computer, the program code itself that is installed in the computer also realizes the present invention. That is to say, the present invention includes a computer program itself for realizing the functional processing of the present invention.

In this case, if the computer program has the functions of a program, the program may be in the form of object code, a program executed with an interpreter, script data supplied to the OS, and so forth.

Examples of recording media for supplying a program include a floppy disk, hard disk, optical disk, magneto-optical disk, MO, CD-ROM, CD-R, CD-RW, magnetic tape, non-volatile memory card, ROM, and DVD (DVD-ROM, DVD-R).

Additionally, a supplying method of the program may be to supply a program by using a browser on a client computer to download from a website on the Internet to a recording medium such as a hard disk. That is to say, the website is accessed, and the computer program itself, or a file according to the present invention that is compressed and includes an automatic install function, is downloaded from the website. Also, the program code making up the program of the present invention can be divided into multiple files, with each file downloaded from different websites. That is to say, a WWW server for downloading a program file as to multiple users in order to realize the functional processing of the present invention with a computer is also included in the scope of the present invention.

Also, the program of the present invention is encoded and stored in a computer-readable storage medium such as a CD-ROM and distributed to users. A user having cleared predetermined conditions can then download key information to decode the encoding from the website via the Internet. The key information therein can be used to execute the encoded program, thereby installing on the computer and executing.

Also, the computer executes the read out program, whereby the above-described functions of the embodiments can be realized. Additionally, based on the program instructions, the OS operating on the computer and so forth can perform a portion or all of the actual processing, whereby with such processing the above-described functions of the embodiments can be realized.

Further, the above-described embodiment functions can be realized even after the program read out from the recording medium is written into memory provided on a function expansion board inserted in the computer or a function expansion unit connected to the computer. That is to say, based on the program instructions thereof, the above-described functions of the embodiments can be realized by the CPU provided with the function expansion board or function expansion unit performing a portion or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-328725 filed Dec. 20, 2007, which is hereby incorporated by reference herein in its entirety.

What is claimed is:

1. A control method for an image processing apparatus in communication with a web server via a network, the image processing apparatus including a scanning unit configured to generate (a) first image data, a storage unit configured to store (b) second image data, and a display unit, the method comprising:
 via the scanning unit, scanning an image of an original to generate the (a) first image data;
 via the storage unit, storing the (b) second image data;
 via the obtaining unit, obtaining content data provided by the web server, the content data including a predetermined form which requests input of image data; and
 via the display unit, displaying, based on the predetermined form included in the obtained content data, a screen including,
  a first display object to display a scanning setting screen for receiving, from a user, a scanning setting for scanning the image of the original for generating the (a) first image data; and
  a second display object to display a selection screen for receiving, from a user, a selection of the stored (b) second image data,
 wherein the screen facilitates appropriate selection of image data to be uploaded in connection with the predetermined form included in the obtained content data from among (a) the first image data generated by the scan of the original and (b) the stored second image.

2. An image processing apparatus in communication with a web server via a network, the image apparatus comprising:
 a memory; and
 a processor in communication with the memory, the processor configured to control:
 a scanning unit configured to scan an image of an original and generate (a) first image data;
 a storage unit configured to store (b) second image data;
 an obtaining unit configured to obtain content data provided by the web server, the content data including a predetermined form which requests input of image data; and
 a display unit configured to display, based on the predetermined form included in content data obtained by the obtaining unit, a screen including,
  a first display object to display a scanning setting screen for receiving, from a user, a scanning setting for scanning the image of the original for generating the (a) first image data; and
  a second display object to display a selection screen for receiving, from a user, a selection of the stored (b) second image data,
 wherein the screen facilitates appropriate selection of image data to be uploaded in connection with the predetermined form included in the obtained content data from among (a) the first image data generated by the scan of the original by the scanning unit and (b) the second image data stored by the storage unit.

3. The image processing apparatus according to claim 2, wherein the content data is described in HTML format.

4. The image processing apparatus according to claim 2, wherein the storage unit stores the second image data in one of a plurality of boxes in a storage device of the image processing apparatus, and
 wherein the selection screen is for receiving, from a user, a selection of the second image data stored in a designated box from among the plurality of boxes.

5. The image processing apparatus according to claim 2, wherein the scanning setting includes scanning resolution.

6. The image processing apparatus according to claim 2, further comprising a transmission unit configured to transmit first the image data or the second image data based on the selection on the screen.

7. A non-transitory computer-readable storage medium storing a program configured to cause a computer to execute the control method of the image processing apparatus according to claim 1.

8. The image processing method according to claim 1, wherein the content data is described in HTML format.

9. The image processing method according to claim 1, wherein the second image data is stored in a plurality of boxes in the storage unit, and
 displaying a designating screen for receiving, from a user, designation of a box from among the plurality of boxes in a case where the upload of the selected image data is selected on the screen.

10. The image processing method according to claim 1, wherein the scanning setting includes scanning resolution.

11. The control method according to claim 1, further comprising transmitting the first image data based or the second image data based on the selection on the screen.

* * * * *